United States Patent [19]

Grindon

[11] Patent Number: 4,846,577
[45] Date of Patent: Jul. 11, 1989

[54] OPTICAL MEANS FOR MAKING MEASUREMENTS OF SURFACE CONTOURS

[75] Inventor: John R. Grindon, St. Louis, Mo.

[73] Assignee: LBP Partnership, St. Louis, Mo.

[21] Appl. No.: 44,992

[22] Filed: Apr. 30, 1987

[51] Int. Cl.⁴ ............................................. G01B 11/24
[52] U.S. Cl. ................................................... 356/376
[58] Field of Search ................................ 356/376, 1, 9

[56] References Cited

U.S. PATENT DOCUMENTS

| | | | |
|---|---|---|---|
| 3,690,242 | 9/1972 | Cruickshank | 355/48 |
| 3,866,052 | 2/1975 | DiMatteo et al. | 250/558 |
| 4,145,991 | 3/1979 | DiMatteo et al. | 356/375 |
| 4,175,862 | 11/1979 | DiMatteo et al. | 356/375 |
| 4,185,918 | 1/1980 | DiMatteo et al. | 356/375 |
| 4,187,011 | 2/1980 | DiMatteo et al. | 353/122 |
| 4,199,253 | 4/1980 | Ross | 356/5 |
| 4,202,612 | 5/1980 | DiMatteo et al. | 353/28 |
| 4,238,147 | 12/1980 | Stern | 354/77 |
| 4,259,017 | 3/1981 | Ross et al. | 356/376 |
| 4,259,589 | 3/1981 | DiMatteo et al. | 250/558 |
| 4,269,513 | 5/1981 | DiMatteo et al. | 256/376 |
| 4,286,852 | 9/1981 | Stern et al. | 354/77 |
| 4,302,097 | 11/1981 | Chlestil | 355/52 |
| 4,357,108 | 11/1982 | Stern et al. | 356/376 |
| 4,443,705 | 4/1984 | DiMatteo et al. | 250/558 |
| 4,443,706 | 4/1984 | DiMatteo et al. | 250/558 |
| 4,448,505 | 5/1984 | DiMatteo | 353/122 |
| 4,494,874 | 1/1985 | DiMatteo et al. | 356/376 |
| 4,508,452 | 4/1985 | DiMatteo et al. | 356/375 |
| 4,511,252 | 4/1985 | DiMatteo et al. | 356/375 |
| 4,634,279 | 1/1987 | Ross et al. | 356/376 |
| 4,653,104 | 3/1987 | Tamura | 356/376 |
| 4,657,394 | 4/1987 | Halioua | 356/376 |
| 4,687,326 | 8/1987 | Corby, Jr. | 356/375 |

FOREIGN PATENT DOCUMENTS 939261 10/1963 United Kingdom .

Primary Examiner—F. L. Evans
Attorney, Agent, or Firm—Haverstock, Garrett & Roberts

[57] ABSTRACT

A system for producing data to represent the three-dimensional shape of a surface including a projector for projecting patterns onto the surface. A sensor for producing representations of selected imaged patterns as projected onto the surface, and a device containing data that represents the relative positions of the projector and the sensor for processing data produced by sensor to generate output data that is representative of the shape of the surface.

26 Claims, 8 Drawing Sheets

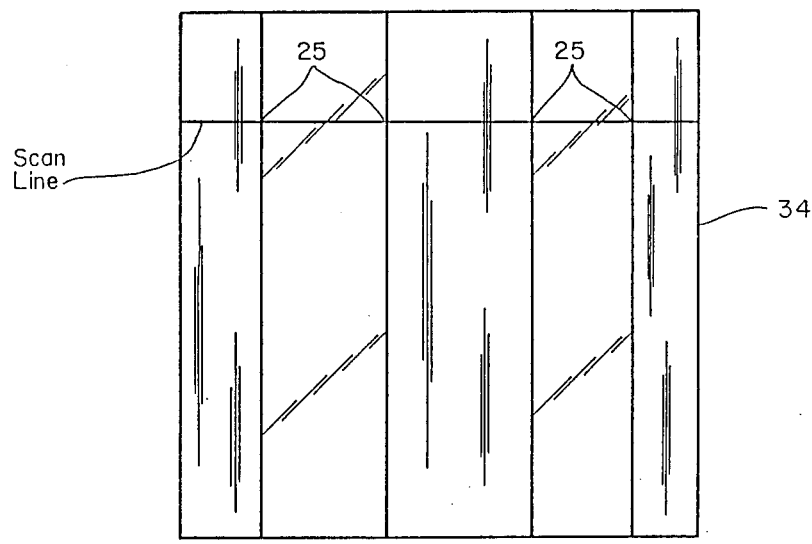
Fig. 2A
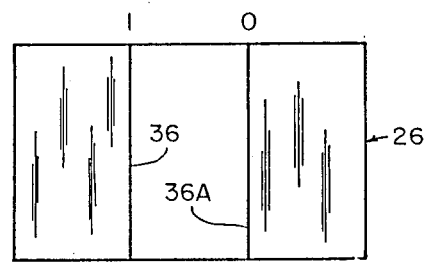 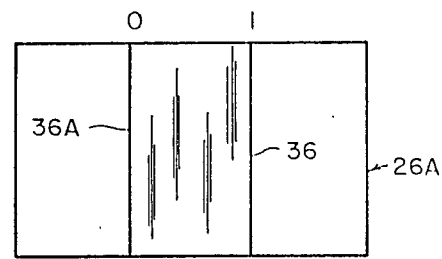
Fig. 3  Fig. 4
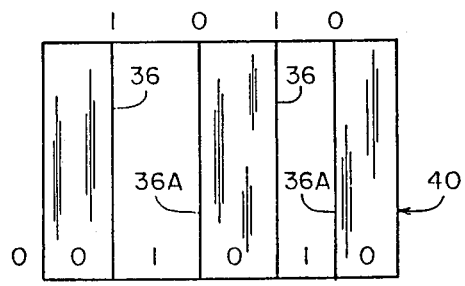 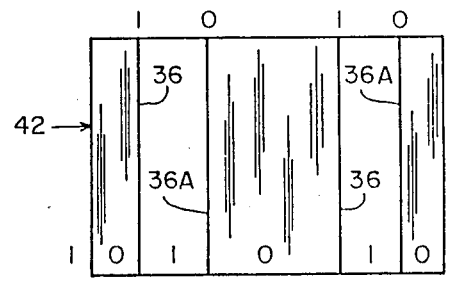
Fig. 5  Fig. 6

Fig. 9

| | | | | | |
|---|---|---|---|---|---|
| 1 | 0000 | 83 | 141 | 149 | 157 |
| 1 | 0001 | 36 | 44 | | |
| 1 | 0010 | 66 | | | |
| 1 | 0011 | 17 | 51 | 105 | 113 |
| 1 | 0100 | 76 | 124 | 132 | |
| 1 | 0110 | 91 | 99 | | |
| 1 | 0111 | 2 | 10 | 26 | 58 |
| 1 | 1000 | 14 | 22 | 116 | |
| 1 | 1001 | 61 | 95 | | |
| 1 | 1010 | 39 | | | |
| 1 | 1011 | 80 | 88 | 128 | 144 |
| 1 | 1100 | 5 | 47 | 55 | 109 |
| 1 | 1101 | 70 | 102 | | |
| 1 | 1110 | 32 | | | |
| 1 | 1111 | 137 | 153 | | |
| 2 | 0000 | 13 | 21 | 133 | |
| 2 | 0001 | 28 | 94 | | |
| 2 | 0010 | 78 | | | |
| 2 | 0011 | 59 | 87 | 127 | |
| 2 | 0100 | 46 | 84 | 108 | |
| 2 | 0101 | 53 | 69 | | |
| 2 | 0110 | 31 | | | |
| 2 | 0111 | 18 | 136 | 152 | |
| 2 | 1000 | 6 | 34 | 140 | 148 |
| 2 | 1001 | 43 | 103 | 155 | |
| 2 | 1010 | 65 | 111 | | |
| 2 | 1011 | 50 | 72 | 120 | |
| 2 | 1100 | 75 | 117 | 123 | |
| 2 | 1101 | 62 | 130 | | |
| 2 | 1110 | 40 | 90 | | |
| 2 | 1111 | 9 | 25 | 97 | 145 |
| 3 | 0000 | 107 | | | |
| 3 | 0001 | 52 | 60 | 68 | 114 |
| 3 | 0010 | 30 | 134 | 142 | 158 |
| 3 | 0011 | 37 | 151 | | |
| 3 | 0100 | 12 | 100 | | |
| 3 | 0101 | 3 | 19 | 27 | 93 |
| 3 | 0110 | 77 | 85 | | |
| 3 | 0111 | 126 | | | |
| 3 | 1000 | 74 | | | |
| 3 | 1001 | 81 | 121 | 129 | |
| 3 | 1010 | 7 | 15 | | |
| 3 | 1011 | 24 | 96 | 104 | |
| 3 | 1100 | 33 | 41 | 139 | |
| 3 | 1101 | 146 | 154 | | |
| 3 | 1110 | 56 | 110 | 118 | |
| 3 | 1111 | 49 | 63 | 71 | |
| 4 | 0000 | 29 | 45 | 115 | |
| 4 | 0001 | 150 | | | |
| 4 | 0010 | 38 | 106 | | |
| 4 | 0011 | 67 | 79 | 135 | 143 |
| 4 | 0100 | 4 | 20 | 54 | |
| 4 | 0101 | 101 | 125 | | |
| 4 | 0110 | 11 | | | |
| 4 | 0111 | 86 | 92 | | |
| 4 | 1000 | 82 | 122 | 156 | |
| 4 | 1001 | 23 | 35 | | |
| 4 | 1010 | 73 | 89 | | |
| 4 | 1011 | 8 | 16 | 112 | |
| 4 | 1100 | 131 | 147 | | |
| 4 | 1101 | 42 | 48 | | |
| 4 | 1110 | 64 | 98 | 138 | |
| 4 | 1111 | 1 | 57 | 119 | |

Fig. 10

| | | | | | | | | | | |
|---|---|---|---|---|---|---|---|---|---|---|
| 123 | 6 | 18 | 40 | 59 | 62 | 84 | 103 | 117 | 133 | |
| 124 | | | | | | | | | | |
| 132 | 27 | 33 | 52 | 71 | 77 | 96 | 110 | 129 | | |
| 134 | 3 | 15 | 37 | 56 | 81 | 100 | 114 | 142 | | |
| 142 | 45 | 89 | | | | | | | | |
| 143 | 11 | 23 | 48 | 67 | 92 | 106 | 128 | 138 | 150 | |
| 213 | 14 | 26 | 32 | 51 | 70 | 76 | 95 | 109 | 128 | 141 |
| 214 | 10 | 22 | 44 | 47 | 66 | 88 | 91 | 124 | 137 | 149 |
| 231 | 60 | 104 | | | | | | | | |
| 234 | 7 | 19 | 41 | 63 | 85 | 118 | 121 | 134 | 146 | |
| 241 | 35 | 54 | 79 | 98 | 112 | 131 | 156 | | | |
| 243 | 29 | 73 | | | | | | | | |
| 312 | 61 | | | | | | | | | |
| 314 | 105 | | | | | | | | | |
| 321 | 13 | 25 | 31 | 50 | 69 | 75 | 94 | 108 | 127 | 140 |
| 324 | 28 | 34 | 53 | 72 | 78 | 97 | 111 | 130 | 155 | |
| 341 | 1 | 4 | 16 | 38 | 57 | 82 | 101 | 115 | 143 | |
| 342 | 8 | 20 | 42 | 64 | 86 | 119 | 122 | 135 | 147 | |
| 412 | 5 | 17 | 39 | 58 | 83 | 102 | 116 | 132 | 144 | |
| 413 | 2 | 36 | 55 | 80 | 99 | 113 | 157 | | | |
| 421 | 9 | 21 | 43 | 46 | 65 | 87 | 90 | 123 | 136 | 148 |
| 423 | 120 | | | | | | | | | |
| 431 | | | | | | | | | | |
| 432 | 12 | 24 | 30 | 39 | 68 | 74 | 93 | 107 | 126 | 139 | 151 |

Fig. 10A

OPTICAL MEANS FOR MAKING MEASUREMENTS OF SURFACE CONTOURS

BACKGROUND OF THE INVENTION

The present invention resides in a novel system for obtaining information representative of the three-dimensional shape of an object in space and more particularly to a novel manner of developing projection patterns that can be projected onto the object each of which is imaged, the images then processed together in a certain way so as to measure the surface form of the object. It is especially important to the invention to be able to project a number of patterns having light and dark areas, the positioning of such areas in the different patterns being formed so as to have certain properties of the edges that are formed by and between adjacent light and dark areas in the different patterns, which correspond to projected surfaces in space, a major purpose of which certain properties is to maximize the number of such surfaces that can be projected while maintaining the ability to unambiguously identify each projected surface using only the sequence of images of the object. Profile lines or edges produced by different patterns will fall on the object to be reproduced. The pattern of the alternating light and dark areas is chosen to facilitate identification of these projected edges that fall on the object and are subsequently viewed and processed to measure the surface form of the object.

There are various systems for obtaining data useful to produce three-dimensional representations of an object. Such systems generally include a projector of radiant energy and a corresponding image recording means. The three-dimensional surface recording technology has grown substantially over the last several decades resulting in even more such systems. One such system, which like the one disclosed here and many others, dating back to early in the 20th century, e.g. Smith in U.S. Pat. No. 891,013, and Edmonds in U.S. Pat. Nos. 1,485,493, 1,615,261 and 1,716,768, and earlier by Willeme in U.S. Pat. No. 43,822, and more recently by Cruickshank, U.S. Pat. No. 4,613,234, and patent application Ser. No. 786,322, and Morioka in U.S. Pat. Nos. 3,580,758, 2,066,996, 2,350,796, 2,015,457 and 1,719,483; and in British Patent No. 439,448, as well as Jeffreys British Patent No. 471,617, comprises a camera-projector pair for the development of a data file which can be stored or used for subsequent representation of three-dimensional surface configurations, and is disclosed by DiMatteo et al in U.S. Pat. No. 3,866,052. With this and all such similar types of systems, the three-dimensional object to be recorded is placed in the field of projection of a light or other type of radiant energy projector, wherein the pattern of the projected light is structured in accord with the method of the particular invention. The surface of the object intersects with the projected light pattern in forming the reflected radiant energy. The radiant energy reflecting from the object is also within the field of view of the objective lens associated with a camera element. The geometric fixed relationship between the object, projector and camera lens is known and such information is subsequently employed together with the reflected radiant energy pattern in representing the surface configuration.

A concern of manufacturers and users of such systems is how to define a coordinate system which can be maintained and which facilitates the gathering of reliable data about the location and surface characteristics of the subject object; and from this information to identify with precision the spatial location of a point or series of points on the object's surface.

The approach claimed in U.S. Pat. No. 3,866,052 is well known in the prior art. See, for example, D. Calas, "Theory and Computer Implementation of Image Processing by Boolean Filters", Washington University of St. Louis Master's Thesis, 1970, as well as his references to preceding literature.

In light of the foregoing comments, it will be understood that a principal object of the present invention is to disclose a method of obtaining higher resolution three-dimensional representations of an object from fewer sequences of projections and recordings than is presently possible, and to obtain a given resolution with fewer projections and recordings. This also means that fewer projections and much less time is required by the present system to obtain data from which to gather information as to the shape of a surface contour. If the information is to be used in the reproduction of the shape of an object or person it means that the object or person needs to pose for a very short time, typically less than one second.

An additional object of the invention is to provide a method of digitizing data to enhance its interpretation and to produce a three dimensional representation of a surface.

Another object of the invention is to teach new and enhanced methods of profile line identification in the recorded image.

Another object is to locate, identify and develop data representative of profile edges projected onto an object and viewed by camera means.

Another object is to provide means to determine the location of points in space along a profile line projected onto an object and to produce data representative of said points in space.

A further object of the present invention is to provide a method of viewing, digitizing and processing of data to produce a quantitative measure of the viewed object.

A still further object of the present invention is to provide means of obtaining data useful to create an enhanced detailed representation of a viewed object without increasing the number of required mask segments.

Another object is to provide a three-dimensional representation means to enhance and ensure the accuracy of obtained data by systematically locating and identifying the location of profiles in a viewed image.

A further object is to obtain data corresponding to surface characteristics irrespective of the surface reflectance characteristics of the scanned object.

Yet a further object is to provide a novel method of accurately locating profiles using projected patterns and their functional inverses.

These and other objects and advantages of the present invention are realized by the present system which is based upon the light beam profiling principles described in John Cruickshank's portrait sculpture U.S. Pat. Nos. 3,796,129, 3,690,242 and 3,688,676. The basic concept disclosed in the Cruickshank patents is to recreate three-dimensional objects without requiring physical contact with the sensed object.

The method described in the Cruickshank patents utilizes the projection of a single planar surface, or sheet, light from a single projector to intersect the surface of the subject to be sensed; and a single photographic camera, positioned apart from the projector, to view and record an image of this light intersection, or "profile". In these patents it was shown that by knowing the positions and orientations of the projector and camera, as well as the focal length of the camera lens, the image of that profile can be projected onto a screen placed at a proper distance and angle from the projector to form a viewable image of a profile corresponding in size and shape to that created upon the original viewed surface. Through the process of moving the sensed surface and the projected light plane relative to one another, with or without concurrent movement of the camera as necessary, such profiles can be repeated at multiple positions over the surface so as to represent multiple profiles, which through a process of interpolation, can be used to represent the sensed surface. As disclosed in the Cruickshank patents, the system was used to manually trace the projected profiles so as to control a cutting machine to produce an approximate replica of the sensed object's surface.

The present system is an important improvement over the known prior art, including the Cruickshank patents. To generate a representation of part or all of a subject surface with the present system, spaced multiple light sheets produced by light sources including a laser light source are projected at the same time. Here, we include "light sheets" and "profiles" to be defined in the edge information between light and dark areas, that projected sheet or boundary forming a surface in space, intersecting in a line on the subject called a "profile". They intersect the subject giving it a zebra like appearance and are viewed together. With this system, instead of requiring N images to be processed for N profiles, multiple boundary surfaces are projected at once and only a smaller number of images need be viewed and processed to locate the resultant intersection profiles due to a novel technique for creating the patterns which uniquely identifies and corresponds the profiles in the viewed image with the projected surface that created them.

Once the imaged profiles are identified, if it is desired to sense more of the surface than is in common view between one projector of multiple surfaces and one camera, then the projector, subject, and camera, or any one or two of these, can be moved and the process repeated to obtain information about additional portions of the surface. The amounts of any such movement must be known quantitatively and employed in the solution. It is also contemplated to use a plurality of spaced stationary projectors and cameras, preferably in a darkroom, and to strobe the projectors in a sequence so that all or any desired surface portion of the object can be viewed and the data obtained processed to produce either a part or a full three-dimensional representation.

The projection patterns employed with the present system are uniquely designed in accordance with the present invention to facilitate identification and correspondence of the profiles in the viewed image with either the light sheets or the boundaries, or edges, between light and dark portions of the projected pattern. Briefly, the scheme is one of arranging light and dark banded areas on at least two projected patterns, such that they meet certain properties. One method of generating a set of patterns that meet these properties is described. In this example, each pattern correlates to a 16-bit long cyclic generatric code. Using this code as a basis, a much longer code is generated that has the desired properties of uniqueness throughout its length, and meets the chosen properties through out its length. By locating a profile in the viewed image, through a process of reading the code correspondng to the viewed image, the corresponding profile in the projected pattern can be identified, and the accuracy of the identification can be checked and if desired cross-checked.

The patterns also may be projected in the form of thin sheets of light rather than dark-to-light or light-to-dark boundaries or edges. This is done by projecting a pattern of thin light lines on a dark background, or vice versa.

The more boundaries or light sheets that are projected at once, the truer the resultant surface modeling. However, if they become too closely spaced, then optical and camera resolution may not separate them in the viewed image, thus losing the information carried by the denser profiles.

The exact spacing is also a subject of the present invention and is detailed in what follows herein. An important advantage is that, unlike previous methods, when using multiple patterns the projected surfaces are approxmiately evenly distributed among the multiple patterns, thus permitting the greatest number of profiles for a given number of patterns, concurrently permitting the greatest separation between profiles in any given image. Further, unlike previous methods, profiles need not repeat at the same place in more than one pattern. The importance of maximizing the separation between profiles in any one pattern is made clear in the following. The problems associated with dense profile packing are alleviated in the present invention by utilizing a series of patterns, which are normally projected and viewed in sequence but may also be projected and viewed simultaneously if the are made separable, such as through the use of different colors, polarigations, or combination thereof. In any one view, the profiles are sufficiently separated to resolve; and by interleaving these sets of pattern profiles any desired aggragate number of profiles can be obtained, at the expense of projecting and viewing a sequence of patterns. But the number of images for a given total number of profiles is relativley smaller than with methods of the earlier art. Further, the method provides uniquely identifiable profile lines, as will be explained. Since within a given image it is known which subset of the total number of profiles was projected, it is only necessary to identify the profiles within the respective subset for each given image. This in turn is made possible by using different spacings among the lines or edges in any one pattern, the spacings chosen to make a unique interleaving sequence among the patterns, this interleaving sequence either not being repeated throughout the pattern, or it repeated then providing additional identifiers to resolve them, thus permitting unique identification of all profiles by observing their sequencing with respect to all the patterns. This is one of the key features of the present invention. Further, in another embodiment, complementary additional patterns can be used to enhance the accuracy of locating a profile edge.

Instead of moving the projector, camera, or subject or a combination of these to sense more of the surface than is in view between one projector-camera pair, multiple stationary cameras and projectors can be used to observe more (or all) of the surface, thus requiring no motion.

BRIEF DESCRIPTION OF THE DRAWINGS

FIG. 2A is a plan view of the projected pattern that produced the profile lines on the object of FIG. 2;

FIG. 3 is a simplified diagram to illustrate a pattern that can be established for use by the subject device;

FIG. 4 is similar to FIG. 3 but shows a complementary pattern;

FIGS. 5 and 6 are views similar to FIGS. 3 and 4 but showing a greater number of boundary lines in a given space;

FIG. 9 is a code representative used for determining the spacing and widths of opaque and transparent areas at the location as taken on radial line 9—9 in FIG. 8;

FIG. 10A is a graph based on the data in FIGS. 9 and 10;

FIG. 10 is a solution chart which corresponds to a typical 6-bit code representative of the code shown in FIG. 9.

DESCRIPTION OF THE PREFERRED EMBODIMENT

The present invention comprises unique and novel patterns which are used to uniquely locate and identify profile lines in a recorded image and to correspond these identified profile lines with surface in the projected patterns. These profile lines are created on the surface of the object to be represented in three-dimensional form. Information is also gathered, which correlates the location of a projector and the projected surfaces, the locations of the camera or cameras and recorded profiles as well as other information with respect to a common coordinate system. The information thus gathered is processed to establish three-dimensional data points which can then be used for whatever purpose may be desired, including the control and operation of a replicator to produce a three-dimensional model of the viewed object.

In its most general form, the goals and objects of the present invention can be explained and obtained using one pattern having two identifiable boundary lines thereon in a one camera, one projector system. Other more generally useful embodiments with multiple patterns each having additional identifiable boundary edges profiles thereon will be disclosed in what follows herein as well as embodiments utilizing multiple camera-projector pairs.

Figure 1:
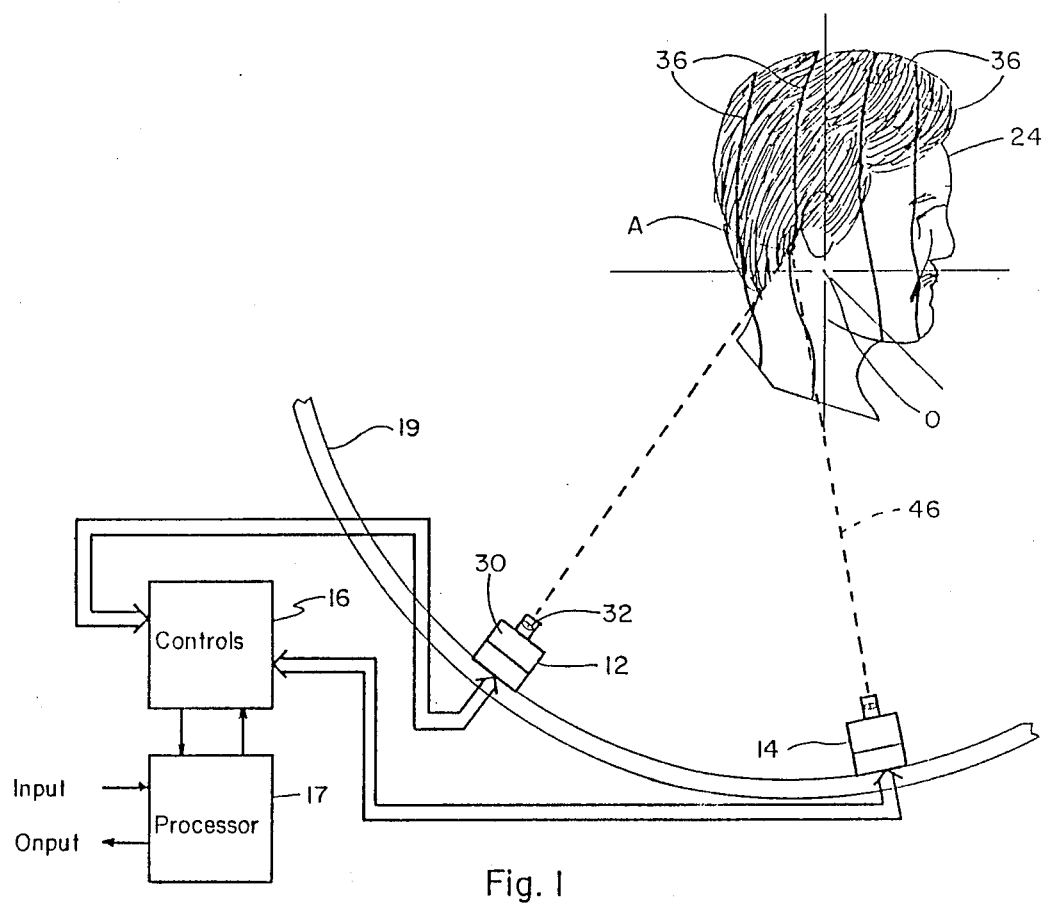
FIG. 1 is a perspective view of the main components of the present system and their orientation.

The system 10 of the present invention is shown generally in FIG. 1 as comprising a projection means 12 for projecting light or other forms of radiant energy onto an object such as 24; a recording means such as video camera 14 or any other means of imaging or photographing the object which is to be measured for some purpose such as to be reproduced; and control means 16 to control operation and synchronization of the projector and recording means and to read and analyze the imaged data,and a processing means such as host computer 17 to further process the obtained data to extract the three-dimensional surface information and present it in a useable form. One or more of the projectors 12 and of the cameras 14 are shown positioned at spaced locations in light tight enclosure 19 in FIG. 1. These means will be detailed in what follows herein.

Figure 8:
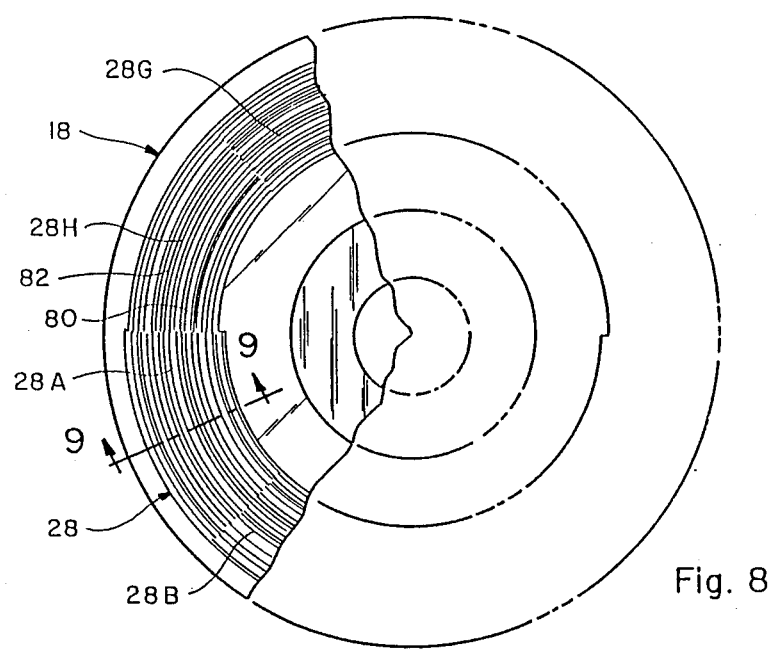
FIG. 8 shows a rotatable disc having a segmented annular pattern for projecting by a projector onto an object to be represented to produce the profile lines thereon.
Figure 8A:
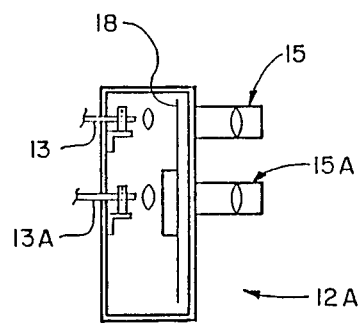
FIG. 8A is a cross-sectionl view through a projector of the type used with the disc of FIG. 8.

The projector 12 is equipped with means such as shown in FIG. 8A for positioning at least one and up to a series of two or more mask patterns in the field of view of the projector's objective lens in order to focus the mask patterns onto the surface of the object whose surface is to be measured and reproduced if desired. The details of the projector 12 are disclosed in co-pending application Ser. No. 044,057, filed Apr. 29, 1987.

FIG. 8A shows an embodiment 12A of the projector 12 having two spaced light sources 13 and 13A and associated lens systems 15 and 15A aligned with spaced locations on the pattern 28 of the disc 18 for projecting light passing through spaced locations on the pattern 28 onto the object 24. Similar means are shown in the referenced application. Other projection means can be used as well, the only requirement being the projection of patterns in space having the properties specified herein.

The video camera's and projector's optical axes are aimed so that the object of interest lies at least to some extent within their common view. The distance between the camera and projector must be greater than zero and needs to be known quantitatively, as do the locations of the camera's and projector's optical axes. Normally, these axes are chosen to intersect at an angle between about 20 to 60 degrees. However, intersection of these axes is not essential to the concept. A general coordinate system is specified; the origin of which is most often, but need not be, established at or near the object of interest. The camera and projector are placed within the system such that their x, y, z position coordinates and angular orientation coordinates are known relative to the general coordinates of the system as thus as well to each other. This informational data along with additional data which locate the positions of the image planes of the camera and projector and their focal points (or lens centers) relative to the general coordinate system as shown in FIG. 1 is obtained and stored for use in subsequent processing. For processing and computational purposes, this data is obtained in both angular and linear forms and is normally stored in appropriate means such as in a computer's Random Access Memory (RAM).

The surface of the object 24 is illuminated and imaged in sequence using mask patterns, which for example may be located on a rotating transparent disc 18 in the projector 12, and if it is desired to sense more of the surface than a one camera and projector pair can view at once, then in alternative embodiments several projectors and video cameras can be arranged so that a designated portion of, or the entire object surface can be illuminated by patterned projections of light or other radiant energy for recording, or a single camera-projector pair can be moved, or the object of interest can be moved, or a combination of these, as long as the desired surface area is illuminated and recorded, and the spatial positions and orientations of the cameras and projectors are known in relation to one another and to the general coordinate system.

Figure 2:
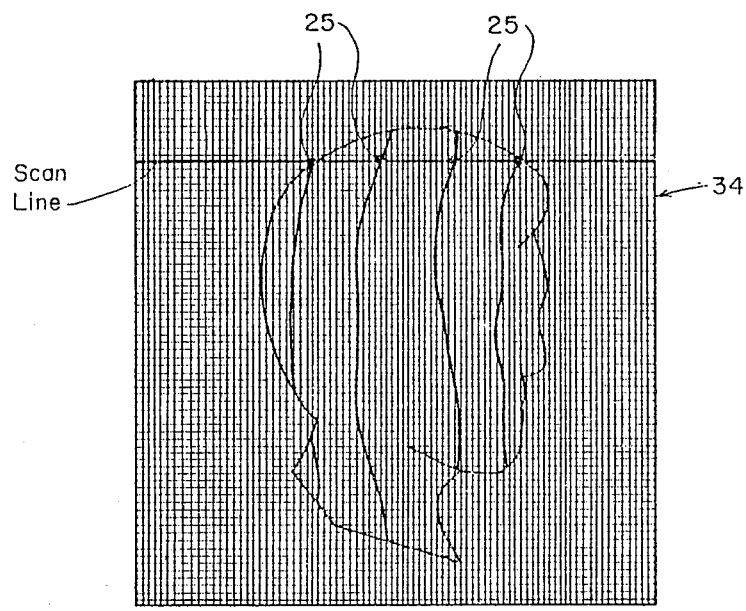
FIG. 2 is a raster produced by a video camera with an image of an object to be represented showing a few typical profile lines formed thereon.

The operational concept of the present system is that the intersection of a line and a surface defines a point in space, and that by defining a number of such points on a sensed surface, that surface can be described by these points. An alternative operational concept is that the intersection of two surfaces in space forms a line, that line defining a contour on the surface of the subject, and that by defining a number of such contour lines on a sensed surface, that surface can be described by these contour lines. By using beams of light projected by the projector 12 having distinctive adjacent areas thereof of black and white or light and dark it is possible to separate the boundaries between these areas into as many lines as possible and as the system can resolve. The projected boundary line or edge between adjacent dark and light areas forms a surface inspace, which as it intersects the surface of an object forms a contour line referred to herein as a profile. Alternatively, the projected surface may be defined by "stripes" of projected light. The light beam or beams strike the object, and are reflected and viewed by an imaging system such as a video camera which includes means associated therewith to record them at identifiable pixel locations as at locations on points 25 where a scan line crosses a profile in an image on a grid or raster type format as shown in FIG. 2. The light rays which strike the pixels at any given location or locations along the profiles depend upon the contour or shape of the object at the location of the profile and, to some extent, the reflectivity of the object.

The patterns projected using the exampled projection means are arranged to have a plurality of clear and opaque sections forming a striped or zebra like pattern when light is projected therethrough. The clear and opaque sections have precisely defined widths which correspond to a determined structure. In the simpliest form (FIGS. 3 and 4) when the system of the present invention is utilized with a basic simple code having only one such mask pattern 26 or 26A, the pattern should comprise either one opaque section and two adjacent clear sections (FIG. 3) or one clear section and two adjacent opaque sections (FIG. 4). It is the boundary lines or edges that are formed by and between the adjacent clear and opaque sections on the mask pattern which are identifiable in correspondence with the imaged profile lines on the object of interest.

With one camera and one projector focused on the object 24 to be reproduced, the projector when its light source is strobed will project a set of optically structured patterns which form corresponding profiles on the object. The mask pattern 28 of FIG. 8 may be on a rotatable disc 18 or on some other similar means located in the projector 12 between a light source 30 and a projector lens assembly 32 if needed. The patterns may be either curved, such as in FIG. 8, or straight, as is most convenient to facilitate the projection process. The light projecting through the mask pattern 28 produces the zebra-like pattern on the object 24 and assuming preferably the object is in a darkroom, the camera will record the image that it sees at its vantage point which will differ somewhat from the projected form of the light depending on the contour of the object, and the light areas so sensed will be applied to a frame or raster 34 (a portion of which is shown in FIG. 2) established in the camera, which raster is made up of a matrix pattern of horizontal and vertical lines of dots, or "pixels", extending across the frame, normally in a square or rectangular pattern. For purposes of illustration, the raster 34 can be formed by 256 by 256 matrix lines. Wherever the profile lines 36 (FIGS. 1 and 2) fall on the frame or raster, it will be possible to formulate codes of data bits, the length of such codes depending on the number of mask patterns utilized and the number of profile lines on each pattern, which data bits are used to uniquely locate and identify the profile lines 36. From a single pattern having two profile lines thereon a one bit code is formulated. The bit indicates whether the transition at the location located along the profile line 36 is from light to dark or from dark to light, thus identifying which of the two profiles is being observed. If, for example, one mask pattern is utilized, the profile line at the transition from dark to light can be assigned the binary numeral 1 and the profile line at the transition from light to dark can be assigned the binary numeral 0.

While the description deals specifically with means for the unique identification of every profile viewed, if ancillary means are also available to assist in profile identification, then complete resolution of all profiles by the method described here would not be necessary. In these cases, more profiles can be employed in the image, i.e. in the current example more than two profiles. Thus, the first profile line 36 in FIG. 3 would be assigned the code 1 and the second profile line 36A assigned the code 0. This code can thus be used to uniquely identify specific points on each profile line in the recorded image. Because the number and widths of the respective clear and opaque (light and dark) areas of the mask pattern are known, it is determinable from the code 0 that on the mask the profile is a transition from dark to light and further because there is only one such profile line 36 in the projected mask pattern of FIG. 3 which could have created this code the profile line is uniquely located, identified and correlated.

If the mask pattern of FIG. 4 is utilized the first profile line is assigned the code 0 and the second profile line would be assigned the code 1 and identification is as previously discussed.

This information for a number of points along the profile lines uniquely identifies the profile lines, the positions of which in the image further are used to formulate data sufficient to compute the three-dimensional points corresponding thereto.

In an alternative embodiment wherein two succeeding mask patterns 40 and 42 are utilized as shown in FIGS. 5 and 6, each pattern can have up to four profile lines thereon, a total of eight, which can be uniquely identified along the lines indicated above. In this case, the identifying codes for each location on each profile line will have three bits and these bits are obtained from mask patterns which are structured to meet the requirements discussed in the following paragraphs.

A desired total number of projected surfaces and their corresponding pattern boundary lines or edges positions are chosen so as to be consistent with requirements of the application. Although not a requirement, these pattern lines are normally either parallel or concentric arcs, spaced uniformly on the pattern. A number of patterns will be used, as will be discussed. The pattern lines are allocated, each to one pattern, among the patterns, subject to certain requirements. Normally they are allocated in equal or approximately equal numbers to each pattern, as substantial advantages arise when the number of lines on a given pattern is at a minimun, and equal distribution minimizes the maximum number on any one pattern. Further, the pattern lines are assigned in such a way that no two on a given pattern fall closer than a specified minimum multiple of the aggregated-line spacing. An example will be given subsequently wherein this minimum multiple is three.

Minimizing the number of lines allocated to a particular pattern reduces the chance of misidentification of one or more profiles, because there are then fewer profiles produced by any one pattern that could become confused with one another. Such confusion is otherwise more probable because of practical limitations in manufacturing, measuring, imaging, and processing accuracies. The chance of misidentification is further reduced by increasing the spacing between adjacent profiles, which also permits better mensuration. The property of allocating a profile to one and only one pattern, of allocating an approximately equal number of profiles to each pattern, and of allocating them subject to a minimum spacing between patterns, all combine so as to permit more total profiles, thus increasing the resolution of the computed three dimensional surface representation, and/or to permit increased minimum separation between any two adjacent lines in any one pattern so as to greatly enhance the ability both to distinguish between them during mensuration and to correctly identify the profiles, as compared with previously available methods such as binary or simlarly coded patterns.

Where the projected surfaces are generated by using projection masks, for example, the pattern lines may be represented on the projection masks as boundary edges between opaque and transparent bands. Alternatively, they may be represented as transparent "stripes" on an otherwise opaque mask background. In either case, where "opaque" and "transparent" areas are referenced, it should be understood that this means any two distinguishable transmittances, such as two different gray levels, two different colors, two different polarizations, or other detectable means of modulating the transmittance. Throughout most of the description, the example used will be one of opaque and transparent areas, and the method of representing pattern lines will be as boundaries between two such areas. The same elemental principles apply in the case where profiles are represented by transparent stripes, although some differences in detail exist. These differences will be described where they apply.

A further property that may be required of the allocation of profiles among the patterns, if needed in a given application, is that uniquely identifiable sequences of allocation must occur, when considered along with other identifier observations, the purpose of which is to permit adequate identification of profiles, necessary for properly measuring the three dimensional surface form, as will be shown subsequently. To explain, consider a situation where there is projected a sequence of patterns, each defining a number of surfaces in space, which are interleaved when considering all patterns in toto. Numbering each projected surface in the interleaved sequence with the number of the pattern in which it lies, an ordered sequence of numbers is thus generated, one number for each pattern surface. Consider, for example, two projected surfaces of the same pattern, which surfaces will therefore carry the same identifying pattern number in the sequence. If the two profiles caused by these projected surfaces of light are not otherwise distinguishable, but if the sequences of numbers in which they lie differ, then the two profiles are distinguishable on that basis. The allocations to the different pattern masks are made such that every pattern line on every pattern is uniquely identifiable by considering a combination of observables including some or all of these, as maybe found useful or necessary in a given application, to wit:

1. the pattern in which it lies, found by corresponding the pattern number with the image number,
2. the dirctiion of the boundary edge, i.e. whether from a light to dark area or vice versa;
3. the type of area, i.e. light or dark, that lies at the corresponding position in each of the remaining patterns, an available measure since no other pattern will have a profile at the same position, and
4. the sequence of pattern numbers corresponding to a sequence of imaged and mensurated profiles.

Note that item numbers 2 and 3 in this list are available only to the boundary-line method of projected surface representation, whereas items 1 and 4 are available to the previously mentioned "stripe" or "light sheet", representation method as well.

Since neighboring profiles are not always observable in an image, owing for example to edges, shadows, or obscuration, the sequence of mask-numbered profiles may often be interrupted in any given scan line, such that a profile that lies at the edge of such an interrupted sequence will not have one or more of its neighboring profiles in the sequence. In this case, the unique identification of a profile such as this is accomplished by choosing that one of the possibly two or greater number of potential identifications that places it in its proper sequential position among the remaining uniquely identifiable profiles of the sequence.

The simple cases shown in FIGS. 3 through 6 are given to illustrate these principles. In practical application, many more projected surfaces are normally employed. FIG. 8, to be explained subsequently, is an example of a set of four pattern masks, each with its complement opposite it on the circle for optional purposes to be explained, for a total of eight patterns. In this example, a total of 158 pattern lines, or boundary lines, are defined, all uniquely identifiable, as will be shown with the aid of FIGS. 9 and 10. More than the 158 pattern lines illustrated are also possible with four patterns. To compare, for example, with binary coded methods of the earlier art, with four patterns those methods are limited to a maximum of the number two to the power of four, or sixteen, uniquely identifiable areas.

Although the illustrations given here show only the cases of one pattern, two patterns, and four patterns, it should be clear that any other number can be used as well, applying the elemental method described, and so are comtemplated as being within the scope of the invention. Explanation of the examples is now resumed.

The location of each boundary line in the first pattern 40 should be sufficiently offset laterally from the location of boundary lines in the second pattern 42 such that no projected profile 36 or 36A from the first pattern 40 creates a profile line in its viewed raster at the same location as a boundary line 36 or 36A from the second pattern 42 would create on its viewed raster. This condition is desirable so as not to unnecessarily duplicate projected surfaces and necessary in order to produce identifying information from the two rasters as to whether the locations on the first raster that establish points along the profile lines or edges fall in light or dark areas on the second raster which, as indicated, has its profile lines at different locations than the profile lines on the first raster. This is important because with two patterns as shown it is possible to locate and identify at least eight profile lines, four from each pattern. However, if a viewed profile were to be located at the same position in both rasters, the second profile line would not impart any new information about the surface characteristics of the viewed object and would be essentially wasted. It is considered a primary feature of this invention that profile identification can be accomplished without need for the overlapping or coincidence of pattern lines among patterns. This is achieved in the example which employs annular projection masks by locating the opaque and clear areas in the disc pattern 28 according to specific requirements as have been defined in general and as will be explained for the current example.

With a one-camera and one-projector pair as discussed earlier, the projector 12 will project a first set of projection surfaces from pattern 40 on the object 24. The coded pattern of profiles produced at the intersection of the projected light surfaces with the object is sensed by the camera and the various profile lines are imaged and placed on a raster. Wherever the profile lines fall on the raster, it will be possible to gather data bits including a first bit indicating which projected pattern created the profile and a second bit to indicate whether at the location of each point where the profile line occurs on the raster, the image transition is going from light to dark or from dark to light. When a second different pattern image 42 is projected a different set of pattern lines will be projected onto the object 24. These projected pattern lines should occur at different locations from those that were projected during the time when the camera image the profiles of the first projection because of the different coding. These second profile lines are similarly sensed, image recorded and placed on a second similar raster. Then the pixel or matrix locations on the second raster device corresponding to the same points forming the profile lines that occurred in the first raster device are looked at and if on the second raster device the corresponding point occurs in a dark spot, a third different bit of information will be produced than if the corresponding point occurs on a light spot. For example, if we define a "scan line" to be a horizontal line in the image as shown in FIG. 2, which runs more or less perpendicular to the profiles, then a given scan line crosses the boundary between light and dark regions at definite points in the image that can be measured. When such a crossing is observed, it is necessary to subsequent mathematical solution for the spatial position of the corresponding point on the object that the particular profile for that point be identified. This is so that the correct projected surface can be used in the calculation of the intersection between said surface and the ray in space defined by the lens center of the camera and the point of intersesction between the aforesaid scan-lineand boundary line in the raster. That is done by observing a unique sequence of observables, or codes, to identify the profile. Continuing with the example, the device produces up to four three-bit codes for each scan line of the first raster. If there are 256 scan lines a code is similarly produced for each one that crosses the profile in the image. By repeating the procedure using the second image raster, additional profiles are found and used to increase the detail and resolution of the measurement and ultimately three-dimensional surface representation.

From scan line one of the first raster four three-bit codes are developed which identify points on each of the profile lines 36 and 36A on the first mask pattern. If pattern or raster one is assigned the binary numeral 0 and pattern two is assigned 1, and if transitions from dark to light are assigned the binary numeral 1 and transitions from light to dark are assigned the binary numeral 0, and further if dark areas on the rasters are assigned the binary numeral 0 and light areas are assigned the binary numeral 1, then using the raster recording shown in FIG. 2 as discussed above the following sets of codes are developed for raster 1, namely, 011, 000, 010, 001, and the codes 101, 111, 110, and 100 are similarly developed for raster 2 not shown. It should be noted that these codes are not unique and can vary depending on the widths of the clear and opaque sections. In this two-pattern example, a total of only eight boundary lines is illustrated, all of which can be uniquely identified using only the pattern number, the boundary direction, i.e. dark to light or light to dark as the boundary is crossed from left to right and the dark or light state of the other pattern at a given boundary line position. Use of the remaining aforementioned identifiers, i.e. the sequence of pattern number, permits additional pattern lines to be uniquely identified. This is illustrated in a subsequent example herein for the case of four patterns. For the present two pattern example, reading left-to-right the pattern number sequence for the eight pattern lines shown is 21211212, although its use is here not necessary for identification of the pattern lines. Also note that, while it is normally chosen to make the increment between successive pattern lines of the aggregated pattern line from all patterns equal, this is not essential to the invention and is not the case in the illustration of FIG. 5 and 6.

The position in the image of the crossing point between a scan line and a boundary between black and white areas can be measured in a number of ways. One such preferred way is to establish a separate threshold intensity value for each pixel in the image, by a method to be described, and to note whether pixels in the observed image are at greater or lesser intensities than the corresponding threshold values at the same pixel locations. If an image pixel is at a greater intensity than the threshold, then it is assigned to the light area, else to the dark area. If any pixels exactly equal the threshold intensity, then they are said to lie on the profile line itself. Tracing the scan line across a boundary, it is observed between which two pixels the above assignment changes, from light to dark, or vice versa. The direction of change, i.e. whether from light to dark or vice versa, is noted, and used as one of the profile identifier observations already discussed. The position of the boundary crossing point is then known to lie on the scan line between these two adjacent pixels, except that in the above-noted situation where an image pixel exactly equals the threshold then the boundary crossing point lies on that pixel position as already noted.

In many situations, it may be desirable or necessary to find the crossing point more precisely than knowing only that it lies somewhere between two adjacent pixels. This can be achieved through a process of sub-pixel interpolation, which can, for example, take the form of the process described as below wherein the following symbols are defined, preliminary to the analysis.

k: The pixel number in scan line j immediately to the "left" (i.e. lesser pixel number) of the boundary, one of the two adjacent pixels described in the preceding text.

k+1: The pixel number adjacent and to the "right" of pixel k, which lies on the other side of the boundary, as described in the preceding text.

I (j,k): Image intensity of pixel k in scan line j.

I (j,k+1): Image intensity of pixel k+1 in scan line j.

T (j, k) Threshold at pixel k in scan line j, determined by a procedure to be described.

x: Calculated estimate of the boundary position as measured from pixel k.

P (j, k) Positon of pixel k along scan line j raster.

P (j, k+1) Positon of pixel k+1 along scan line j of raster.

w: Distance along scan line between pixels P(j,k) and P(j,k+1).

Figure 7:
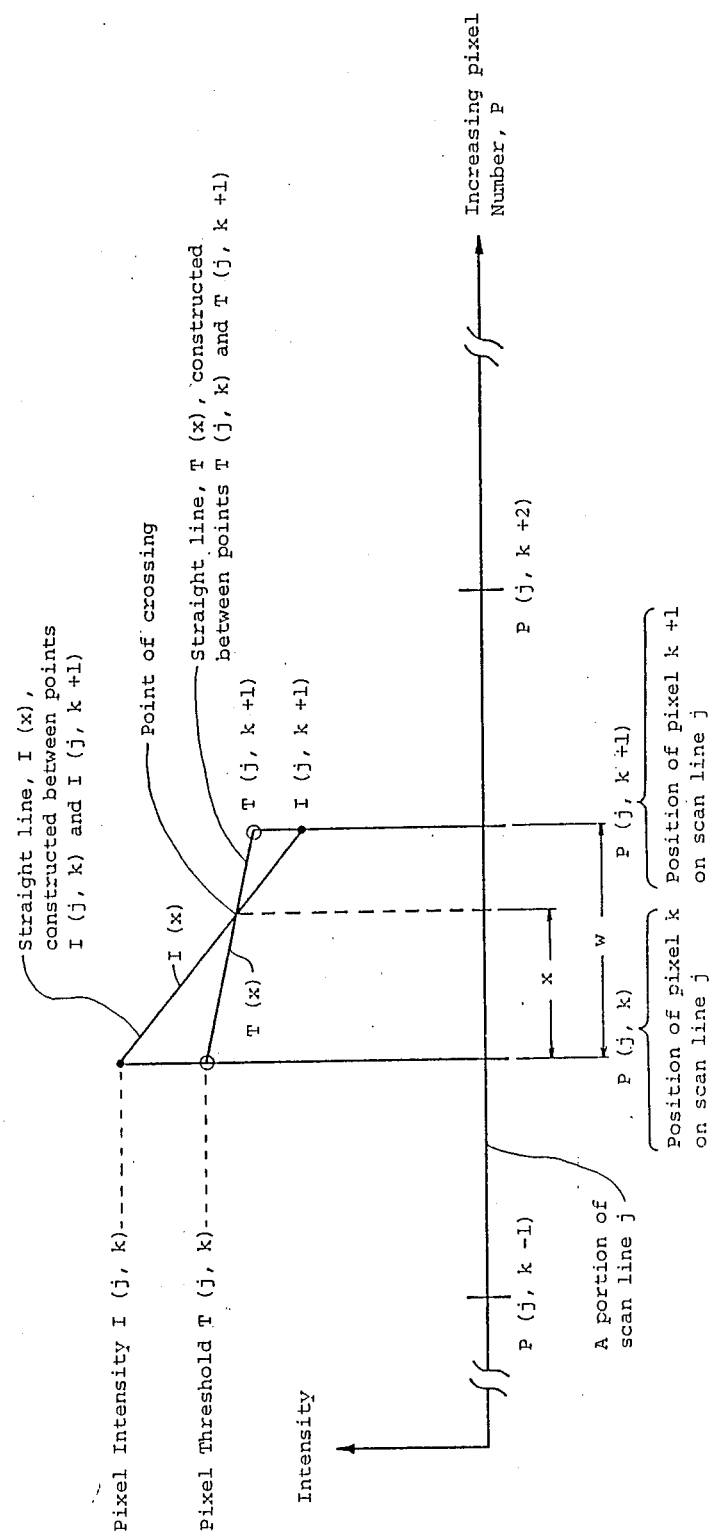
FIG. 7 shows a graphical construct used in the explanation of a sub-pixel interpolation method that increases the accuracy of mensurating profile positions within imaged views of a pattern-lluminated subject.

With reference to FIG. 7, the sub-pixel distance, x, is estimated. It is the distance from P (j, k) to the crossing point of the two lines, I(x) and T(x), constructed as illustrated thereon. To solve for this point, and therefore solve for the value of x, equations for these two lines will be employed. They are:

$$I(x) = (1-x/w)I(j,k) + (x/w)I(j,k+1)$$

$$T(x) = (1-x/w)T(j,k) + (x/w)Y(j,k+1)$$

At crossing point shown, x satisfies the equation $$I(x) - T(x) = 0$$

Substituting and negating, the following equation is obtained:

$$[(x/w)-1][I(j,k)-T(j,k)] + (x/w)[I(j,k+1)-T(j,k+1)] = 0$$

Solving for x, $$(x/w)[I(j,k)-T(j,k)+I(j,k+1)-T(j,k+1)] = I(j,k)-T(j,k)$$

and the solution is $$x = w[I(j,k)-T(j,k)]/[I(j,k)+T(j,k)-I(j,k+1)-T(j,k+1)]$$

The solution for x using this equation, or other equation achieving a similar result, is normally automated, implemented in a general purpose digital computer, but may also be implemented in other ways, such as through other types of computers, analog and/or digital circuitry, or combinations thereof.

The above-mentioned threshold may in one preferred implementation be determined as follows. While a fixed threshold may be employed, i.e. one whose values for all pixels in the image are equal to a single constant value, this method, while useful in simple systems, suffers loss of accuracy owing to field variations in illumination source flux, and/or to variations in reflectivity from different parts of the scanned subject, which in turn affects the interpolation accuracy adversely. This occurs because, although the mask pattern may exhibit abrupt, accurately defined boundaries between the opaque and transparent areas, imperfect lenses and imperfect focus effects, both in the projector and in the camera, as well as light diffraction and light dispersion effects in translucent subjects, causes the boundary to be somewhat smoothed or blurred in the viewed image, such that varying the threshold level causes variation in the crossing point and thus variation in the solution for the boundary position measurement. It is clear, then, that for best boundary measurement accuracy the threshold must be properly set. It has been discovered that, if the threshold at a given pixel is chosen to equal a constant fraction, say one-half, of the intensity that would occur at that pixel given a fully illuminated subject, i.e. one where a pattern-forming mask were transparent over its entire area, without opaque areas as described for all other pattern-forming masks, then accurate boundary measurements are produced. Thus, by imaging a fully-illuminated view of the subject, and multiplying each pixel intensity in that image by a constant fraction greater than zero but less than unity, say one-half, then threshold values are obtained that can be employed in the mensuration processing described, permitting accurate sub-pixel measurements of boundary positions within the previously described imaged views of the pattern-illuminated subject.

Alternatively to imaging a separate fully-illuminated view, a full-illumination view can be synthesized from the sequence of patterned views, provided that the pattern masks are chosen such that each x, y point occurs in a lighted area on at least one pattern in the sequence. Then the fully-illuminated view can be synthesized by selecting at each pixel position the maximum intensity of all images in the sequence.

These calculations, as well as the previously discussed image processing steps, can be implemented in software within a suitable computer, such as a general purpose digital computer, or they may be implemented in a specialized computer, analog or digital electronic hardware, or partly in hardware and partly in a computer, or other such means or combinations thereof as will be apparent to one skilled in the art.

Alternatively, the boundary crossings can be found through the use of secondary projected patterns, which have lighted areas corresponding to the primary pattern's dark areas, and vice versa, such that each pattern line position is represented in two complementary images, where if in one the boundary crossing is from a light to a dark area then in the other the corresponding boundary crossing is from a dark to a light area, and vice versa. Then by comparing the pixel intensities, of the image observed when the secondary mask is projected, on a corresponding pixel basis with the pixel intensities of the image observed when the primary mask is projected, it is found that these pixel intensities along a scan line cross invalue as a boundary is crossed from a primarily light to dark region, the adjacent pixels thus straddling the crossing, i.e. lying to each side of the boundary, and thus defining its position to lie between them. The same means of sub-pixel interpolation can be applied in this alternative to increase measurement resolution, by employing the difference of these two image intensities for I(j,k) and setting the threshold T(j,k) to zero for all j and k. The main advantage of this alternative is that somewhat better boundary position measurement accuracy can in most cases be achieved than through the previously described threshold method. The main disadvantages are that additional patterns must be projected and additional images must be processed.

While the preceding illustrations employ the concept of a "scan line" intersecting light-to-dark and dark-to-light boundaries, or profiles, in the image, it is not necessary to use this construct in order to find the desired measurements. For example, dispensing altogether with the concept of a scan line, a boundary itself may be traced along its length, finding a locus of points that define the curve of the boundary as it traverses the image. The only requirement is that, whatever means are used, all or a desired part of the boundary, or profile, be measured with respect to the coordinates of the image, and expressed in a way so that rays in space can be found that both pass through the lens center and lie on the boundary in the image.

Continuing with the example illustrated in FIGS. 5 and 6, in addition to locating and identifying each profile line found in the images with a three bit code, the pixel locations along each profile line 36 and 36A are gathered and stored. These pixel locations are identifiable in relationship to the general overall coordinate system. With the obtained data and information, it is now possible to solve for the three-dimensional spatial coordinates of the profile lines in the viewed images, to resample this data if desired to place it in the same or other coordinates on a uniformly spaced or other grid suitable for convenient representation, and to then create the output data file which is ultimately provided to the user or to any further processing stages that may be needed for a particular application.

To convert the two-dimensional image plane to three-dimensional points in space in accordance with the present invention, data in the form of arrays of numbers corresponding to the pixel numbers where a profile line or edge occurs in the image plane are required. This is done using the profile identification codes, with the scanline in which each particular point is found being mathematically correlated with data defining the location of the projector and the viewing cameras relative to a predetermined general coordinate system. This takes into account the pattern line spacing on the disc 18 and the focal lengths of the camera and projector lenses. The projector and camera coordinates relative to the system are obtained in both angular and linear translations.

Because the position of the camera and the projector are fixed with respect to a reference coordinate system whose center is at point O, as shown in FIG. 1, it is possible to determine the location in space of any point such as the point A which is on one of the pattern lines 36 or 36A projected at the object by the projector 12. This is done, as aforesaid, by projecting different patterns at the object.

Again by referring to FIG. 1, it can be shown that the location of a point, such as point A on the surface of the object, can be determined relative to the origin or center O of the reference coordinate system by solving mathematically for the intersection of a surface of light created by the projection of any one of the pattern lines and a line created by the light reflected from any point where that surface of light intersects the object, such as point A, through the lens of the camera to the image plane of the camera. It should be noted that point A on the object corresponds to one of a continuum of points comprising one of the profile lines on the object. Physically the light rays from a given pattern line on the mask pattern are constrained to travel in a surface defined by the lens center of the projector and the pattern line on the pattern mask 18. For example, when the pattern line is straight, this surface can be characterized by three points. The first is the projector lens center and the other two points are any two non-coincident points on the pattern line of the mask pattern. The light ray lying in that projected surface of light which causes point A to be illuminated on the surface of the object is scattered therefrom creating secondary rays, some of which enter the camera lens therefrom and are viewed and recorded by the video or other type of camera and appear at a point, or essentially a point, on a raster, as previously described herein. From this raster it is possible to obtain the two-dimensional coordinates of each point of the recorded image of each projected pattern line relative to the reference coordinate system. The ray of light 46 reflected from point A on the object passes through the lens center of the camera and strikes the image plane therein thereby resulting in the recorded image at that location. The light ray 46 is one of an infinite number of such rays which are so reflected over different directions. If each individual ray of light is considered a line in space, the ray that passes through point A on the image plane of the camera and through the lens center intersects the projected pattern surface at point A on the surface of the object, and the coordinates defining the location of point A relative to the origin of the reference coordinate sytem is determined by the intersection of this line and the identified projected pattern surface.

The same can be done for every point where a scan line crosses the various imaged profiles to determine the three-dimensional shape of the object along each profile line. Selecting how close together the various projected pattern surfaces are will then determine how much detail will be in the resultant computed surface representation. If only a few profiles are projected onto the object 24 then the detail will be coarse. On the other hand, if many pattern lines are projected, it will be possible to get much finer detail into the surface representation. It can therefore be seen that codes for producing patterns 28 like those on the disc 18 of FIG. 8 to meet the requirements described previously are very important to the present invention. The result of the above process is a set of three-dimensional object points which can be used as they are but normally are resampled onto a uniform grid, and may also be converted to be represented in another coordinate system if necessary to the particular application.

The object points described above are generally unevenly distributed in the selected coordinate system. Each object point has an associated X, Y, Z value, where X, Y, Z define the location of the point in the reference coordinate system defined earlier herein. If the X, Y plane is thought of as the surface of a table, then the object points can be described as spikes protruding from the table. By this analogy, the table surface corresponds to the X, Y, plane, and the spikes represent the Z value at a particular X, Y point. The process of resampling interpolates the distance between Z values to create an array of points that are uniformly spaced in the X, Y plane. Now, if the surface is such that multiple values of Z occur at one or more X, points, then a coordinate system $X^1 Y^1 Z^1$ can be defined that is rotated and/or otherwise transformed with respect to the X, Y, Z reference coordinate system, the rotation and/or transformation chosen such that when the three-dimensional object points are expressed in this $X^1$, $Y^1$, $Z^1$, system then $Z^1$ is single-valued in $X^1$, $Y^1$ and so may be resampled as described. This is always physically possible for the three-dimensional object points computed from any one camera, because they are derived from single-valued imagery.

The completed uniform grid in a preferred embodiment is created by examining every individual three-dimensional X Y Z object point one at a time. Because of the nature of the surfaces scanned, which are real objects, each point on the surface is positionally correlated with other points in the vicinity thereof. Based upon the nature of the surface of the particular type of object, weighting values can be assigned to indicate the influence of an object point on the surrounding grid points based on how far away they are in the X, Y plane from the X, Y location of the object point under consideration. The resampling process proceeds recursively as will be explained.

If the density of computed three-dimensional X, Y, Z points on the surface of the object is sufficiently great, these weighting values need only approximate the true correlation of the surface. One possible weighting function that has been found to be satisfactory for a human head form representation is expressed by this formula:

$$w = 1/(1+cd)^4$$

where w is the weighting factor, d is the Euclidean distance between the $X^1$, $Y^1$ plane projection of the computed $X^1$, $Y^1$, $Z^1$, three-dimensional object point under consideration and the $X^1$, $Y^1$ grid point under consideration, and the constant, c, is a proportionality factor selected empirically so as to best model the surface of the object. Further, when the weight, w, is calculated to be less than an empirically derived minimum amount, m, then computation can be reduced, with only a small deleterious effect, by not accounting for the influence of the object point on the grid point in such a case. This is equivalent to account for the effects of this influence only where the distance, d, satisfies the inequality, $$d < (m^{-\frac{1}{4}} - 1)/c$$

Two separate tallies are kept for each grid point, one being the sum of the weighting values of the $Z^1$ component calculated for that grid point as described above, and the other the sum of the weighting values times the magnitude of the $Z^1$ values of the object points.

After all points which were created by the profile lines have been placed on the grid and resampled, the running "sum of weighting values times the $Z^1$ values" is divided by the running "sum of the weighting values" to create a grid Z value that is the weighted average of all the object points that are within the above-defined Euclidean distance of the grid point. This information which may be in the form of a two-dimensional array, may then be sent to a post processor where the resampled three-dimensional form information is placed in the desired output form.

The above description traces the data manipulation for a single camera, single projector system. In a preferred embodiment six cameras and six projectors are used to cover or substantially cover all sides of the object 24 to be reproduced. While six cameras and six projectors are preferred in one particular application, any number of cameras may in general be employed with the same or any other number of projectors within the contemplated scope of the invention, and in fact other numbers of cameras and projectors may be preferred for other applications, the objective being to adequately sense the object's surface. Each projected pattern in the six camera, six projector system may be seen by all six cameras in general, but all six camera views need not be processed. For a particular arrangement, three of the six cameras are chosen as best positioned for each projection, and so only three of the six available views are processed for each projector. Other choices may, of course, be made. Thus the above data manipulations are performed 18 times (once for each of three camera views processed for each of six projectors). Because these eighteen surface segments overlap in space, it may also be desired necessary to combine them to ultimately obtain a single representation of the surface.

If, as would be the usual situation, each of these segments were resampled in a common $X^1$, $Y^1$, $Z^1$ coordinate system, then the resampled points are comensurate among the surface segments. If not, then they must be converted to a common system of coordinates if they are to be combined. It should be noted that it is not always necessary that these segments be combined, since individual segments considered together form a full representation of the sensed surface, which may be satisfactory for an intended application. If it is desired to combine the segments into a common representation, then a preferred method is to accomplish this during the above-described resampling process. The computed three-dimensional X, Y, Z object points of each segment are transferred if necessary as described previously to a common $X^1$, $Y^1$, $Z^1$ coordinate system in which the resampling of all surface segments is to take place. Proceed them with the resampling process to a uniform grid in the $X^1$, $Y^1$ plane of this coordinate system, as previously described, taking all object points of all segments in turn to generate the combined resampled uniform array representing all of the surface segments. This method required that the arrangement of projectors and cameras be such that it is possible to define an $X^1$, $Y^1$, $Z^1$ coordinate system that simultaneously satisfies, or satisfies as closely as necessary for practical purposes, the single-valued requirement in $Z^1$ for the resampling method described. One arrangement found to satisfy this requirement is that wherein the projectors and cameras are more or less evenly distributed on a whole or partial sphere about the scanned object, and where the $X^1$, $Y^1$, $Z^1$ coordinate system is a spherical system centered or approximately centered within this array of projectors and cameras.

Where the single-value requirement for the described resampling method is not met, then other methods of representation can be used. In one such method, commonly encountered in the field of computer aided design, a Cartesian, i.e. rectangular, $X^1$, $Y^1$, $Z^1$ coordinate system is employed, wherein the surface is represented by contours defined by the intersection of selected planes with the computed surface. In this method, a computed $X^1$, $Y^1$, $Z^1$ object point can be represented by projecting it onto the nearest cutting plane, or for greater precision local surface patches can be fit to the data, the surface patches themselves constituting a combined-data representation, or the contours defined by the intersections of these surface patches with the above-described cutting planes can be employed as the representation. It is clear that there are many ways to implement the combination of computed three-dimensional surface segments, with preference of one method over another depending on the typ of object scanned as well as the preferred form based on the particular use to be made of the data.

Figure 11:
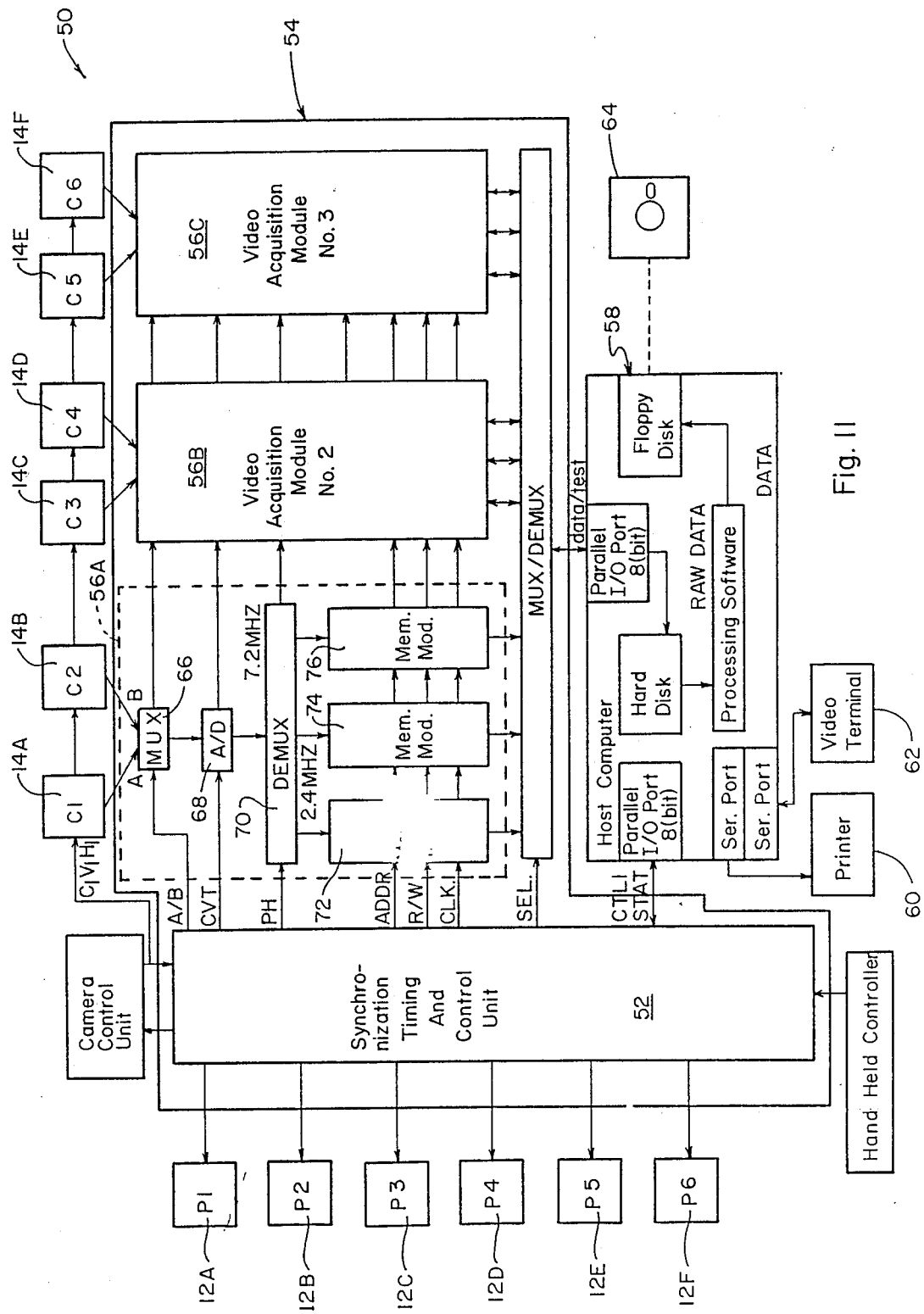
FIG. 11 is a schematic block diagram of circuitry for controlling the operation of the projectors, cameras and for producing the information outputs.

FIG. 11 is a schematic circuit diagram showing one form of circuit 50 for use with the present device. In the circuit as shown there are provisions for six projectors 12A–12F and six video cameras 14A–14F. The circuit can be modified in an obvious manner to accommodate other numbers of projectors and/or cameras. The projectors are controlled by a timing and control unit 52 of a video acquisition unit (VAU) 54. The timing and control unit 52 has a connection to each projector and is used to predeterminately synchronize pattern position and control the strobing of the light sources 30 in the projectors 12A–12F in a time ordered fashion and to synchronize the strobing with the imaging by the cameras 14A–14F. Each time a projector is strobed the video camera or cameras that are in position to see the light projected by that projector have profiles formed on their image rasters in the manner described above. The outputs of the video cameras 14A–14F are then fed into respective video acquisition modules 56A–56C, in this example one such module being provided for each two video cameras 14 since as already discussed for the example shown only three cameras need be accessed at any one time. These modules digitize the information received by the cameras and store that information in Random Access Memories. The data thus stored is thereafter fed to a Host Computer unit 58 which processes the data to extract the three-dimensional surface information as described previously herein, and reformulates it into a usable form such as recording it on a printer 60, feeding it to a video terminal 62, or generating a floppy disc 64. It is to be understood, however, that the sequence in which the projectors are strobed and in which the cameras store the data produced during the strobing is not important as long as all of the data that is projected onto the image, such as all of the profile lines, are viewed by the corresponding cameras in a known order and a record made thereof. For example, the projector 12A can produce an image which may be viewed by video camera 14A and the outputs of the camera 14A are then fed through a multiplexer 66 for conversion to digital form in an analog to digital converter 68, and allocated through demultiplexing unit 70 to one of three Random Access Memories 72, 74 and 76 for later use in the manner indicated above. The use of more than one memory module, such as the three shown in this example, allows the use of slower, less expensive memory modules, as the data rate at each output of the demultiplexer is lower than its input data rate by a corresponding factor.

Referring to FIG. 8 there is shown a round disc ember 18 for use in the projectors 12A–12F of the present device. Alternatively, linear or other patterns can be employed, as is most convenient to the particular projection means selected. The disc member 18 is shown having the annular encoded area 28 formed thereon near the periphery thereof, and the encoded area 28 is shown divided into eight equal length segments 28A–28H each formed by a plurality of light and dark regions or lines. Segments 28A–28D represesnt four different patterns, and 28E–28H their complements. The locations and widths of the light and dark regions in the four patterns are different according to a code as will be explained in connection with FIGS. 9 and 10 so that regardless of which segment is positioned between the light source and the lens system of a particular projector, the image projected thereby will be a series of elongated light and dark areas, but no two arrangements of light and dark areas need be the same for any two segments and none of the pattern lines formed by and between any two light and dark areas in different patterns will fall on the object 24 at the same location, except that with the optional use of the complementary patterns as shown here, each profile line will thus appear at the same position in two segments, that is the segments containing the primary pattern with that pattern lines and its complement. This is important because it means that no two patterns 28A–28D will form profiles on the object when projected thereon which will have edges or profile lines that fall exactly on the same spot or location on the object. This feature of staggering the location of profile lines for each pattern is a very important advantage to the present invention because no profile need be repeated among patterns, thus allowing for more total distinct profiles among all the patterns which in turn produces better resolution of the three-dimensional surface representation.

As shown in the embodiment of FIG. 8, the widths of the clear and opaque bars or areas 80 and 82 on segments 28A–28D are determined and located such that none of the patterns would project profile lines on a viewed object such that profile lines formed by adjacent transparent and opaque areas fall on the same locations. This is one of many possible patterns that share the desired properties described previously. Such a distribution of varying width areas 80 and 82 that meet the stated requirements can be determined in a variety of manners, including by trial and error although this is very difficult to do as the number of areas 80 and 82 and the number of patterns increases.

In the disc construction shown in FIG. 8, the coding of the segments 28E–28H are the binary complements of the coding of the segments 28A–28D respectively. Although binary complements are not required to achieve the objective of the present device, they are utilized in some embodiments to assist in more accurately locating the profile lines in the viewed image of the object 24 as already described. A novel method for utilizing the complementary patterns will be discussed in what follows.

It can be seen that with the previously described construction using the six projectors 12A–12F and the six video cameras 14A–14F as shown in FIG. 11 it is possible to gather information from which to locate a vast multiplicity of individual points or locations in space to represent the shape and contour of the object 24. Thus it is possible by accurately locating the pattern lines on the disc 18 and by using projectors and cameras located as shown to achieve results heretofore unobtainable by any known device including those discussed above.

The details of the circuitry and the manner in which the data is stored is of secondary importance to the basic principles of the present invention which can best be understood, as already explained, by considering a single projector capable of projecting succeeding but different light patterns onto a subject, and of video cameras located to record what they see of these projected patterns, and the ability to use the data so received to feed into electronic circuitry capable of storing and processing the data to produce outputs representing the surface shape of the subject which can then be used for controlling the operation of a machine such as a replicator machine or for some other purpose.

The patterned disc 18 is normally rotated at some desired speed during operation of the device 10 with the rotation motor controlled by synchronizing circuitry so that the angular position of the patterned disc at any point in time can be accurately determined. Normally, the disc rotates continuously, but alternatively it could be stepped from pattern segment to pattern segment as desired. The rotation of the disc and the timing of the strobing of the projectors is extremely important to the present invention and are controlled by the controller unit 52 (FIG. 11) which may include a microprocessor or other suitble circuitry. All of the projectors are similarly strobed in a predetermined sequence and the patterns projected onto the subject are viewed by certain one or more of the cameras, and the information obtained processed and/or stored for later use. The projections need not be strobed in any particular order, nor need the pattern segments be placed on the disc 18 in any specific sequence so long as each processed image can be associated with the pattern that generated it. Pattern projection by means of a synchornized rotating disk as described here is only one of many possible means of projecting different patterns onto the subject. Other means might be by using a filmstrip projector, a slide projector, a single mechanically or electronically alterable mask, simultaneous projection and separation employing different colors and/or polarizations for each pattern, and so forth. All such projection means are within the scope of the present invention. With the present system as described, very fast and efficient sequencing of the segment patterns is possible, normally limited only by the maximum frame rate of available video cameras.

The projected patterns, though arcuate in shape as illustrated in FIG. 8, could alternatively be otherwise shaped, such as straight lines over the areas of use, provided that, whatever shape is chosen it is properly accounted in subsequent processing. The arcuate shape is chosen for the illustration because it is more tolerant of angular position uncertainty than are other shapes, thus easing the tolerances on the aforementioned synchronization between the rotation of the pattern disc and the reference timing of the control unit. It is also contemplated to place a second light source and associated second projection lens assembly at another location on each projector. The second light source would be strobed on a different time schedule and, for example, if located 90° from the first light source would project patterns at an orientation 90° relative to those of the first light source. By projecting patterns with their profile lines oriented at different angles, whether by this or another method, and viewed by cameras from the same or different positions, additional data can be obtained and processed to achieve even better resultant three-dimensional representation accuracy than could be obtained if all of the profiles are oriented the same. This benefit is achieved in the example by using a single projector having two spaced light sources and associated lens assemblies but with a single rotating disc 18, although any other method of achieving the same effect is comtemplated within the scope of the invention. In the usual situation, the two pattern orientations would be chosen to be 90° apart which produces the greatest difference for the patterns shown and which is easy to achieve using the same disc. Such a projector is disclosed in co-pending patent application Ser. No. 044,057 of the present inventor.

In operation, initially the present light sources 30 are strobed under control of the Timing and Control unit 52 in Video Acquisition Unit 54 (VAU) in a predetermined sequence, synchronized with the video camera frame interval. At any given time, only three of the six cameras 14A-14F are used in the particular configuration illustrated, which means that only three camera input channels are required in the VAU, one of each pair of cameras being switched onto a given channel at any one video "frame" time. In a typical operation, the cameras produce data at a rate of approximately 7.2 million "pixels" per second (MHz), whereas normal relatively inexpensive computer memory integrated circuits (I.C.s) can not operate at that rate. In order to make use of the less expensive memory integrated circuits, each channel is shown having three memory sections, each operating at one-third the camera's pixel rate, or at approximately 2.4 MHz. This is accomplished by sequencing the video signals among the three memories 72, 74 and 76, each in turn, such that each memory 72, 74 and 76 need operate at only one-third of the rate of the video input thereto. When these memories are later 'read' by the computer, they are sequenced in such a way as to recreate the order of the original input data stream. While the factor-of-three rate reduction is illustrated, any other can also be used, the optimum factor depending on the specific application. A memory-test feature may optionally be included to detect any faulty memory operation. With this feature the computer writes known patterns into the memories, and then reads the data back checking to verify its accuracy.

Figure 9:
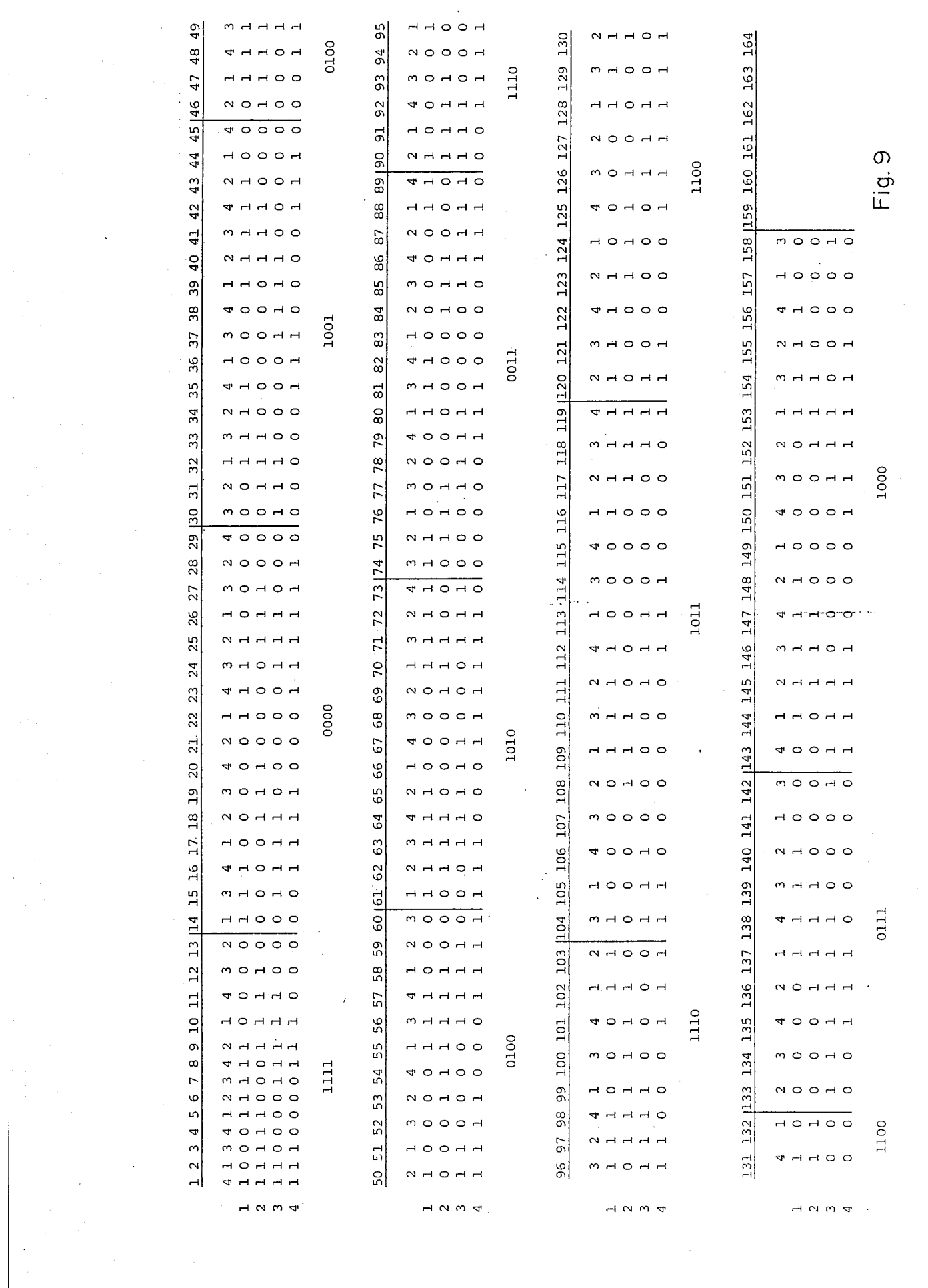

The location and widths of the members that make up the bar patterns of the four primary segments 28A-28D on the disc shown in FIG. 8 are preferably determined in accordance with a synthesis method developed by the inventor. This synthesis method is important to the invention and eliminates to a large extent tedious trial and error methods associated with designing the bar patterns in the mask segments. There remain many possible bar patterns meeting the aforesaid requirements, of which the creation of one is shown here, which shows an efficient method for generating this and other possible similar patterns. It is the class of patterns meeting the aforesaid criteria that is the invention, not only the one pattern shown. The specifics of designing the four primary segments of FIG. 8 can best be understood by examining the code used to create the segments. The code sequence for producing the segments 28A-28D of FIG. 8 is shown in FIG. 9 wherein a sequence of numbers from 1-158 respond directly, but in arbitrarily determined units, with the radial width along section line 9—9 of the individual mask segment 28A of FIG. 8. For a second example, where the bars are straight rather than curved, the corresponding measure would be the distance along a line crossing the bars, and so forth. Regardless of the pattern arrangement, however, the positioning of the bars and their widths is determined similarly, as described. The code as shown and the width of the segment 28A, as shown are for purposes of illustration since a different code can be used and the code length could be a greater or lesser number than 158 as long as the overall code complies with the stated criteria for light and dark areas of the pattern employed. Furthermore, the width of each primary segment 28A-28D of the disc pattern shown in FIG. 8 corresponds to one of four horizontal rows of binary 1's and 0's as illustrated in FIG. 9. Each of these four rows of 1's and 0's is prefaced by an identifying number from 1-4. If each binary 1 is considered a dark position and each binary 0 a light position it can be shown that the horizontal row labeled 1 at the left end illustrates numerically the widths and transparencies of the bars along section line 9—9 of segment 28A and similar correspondence can be shown for segments 28B, 28C and 28D of FIG. 8 with the rows labeled 2, 3, 4 respectively in FIG. 9. The sequence of 1's and 0's illustrates that on segment 28A, for example, the pattern begins with a black section of unit width 1, then has a clear or transparent section of unit width 3, followed by a dark section of unit width 5. This code can be related to segment 28A throughout the width of the segment.

The total 158 unit length long code string of FIG. 9 is further subdivided into subpatterns. These subpatterns vary in length based on the code design criteria yet to be detiled. For purposes of illustration, the subpattern between units 14–29 inclusive is considered the base or reference subpattern of the total code string. Also shown in FIG. 9 is a sequence of numbers ranging from 1-4. There is one of these numbers under each unit location. These numbers dictate which mask pattern segment has a boundary line or transition from dark to light or light to dark at that particular unit length location. For example, at unit location Number 2 there is the transition Number 1 which indicates that when moving from location Number 1 to location Number 2, a boundary line is positioned on segment 1. It is also shown that the transition which created this line is from dark to light. Similar readings can be made at the other 157 locations in FIG. 9.

This 158 unit may be determined by first finding a shorter sub-pattern code, such as the base sub-pattern discussed earlier, that obeys certain requirements, and by then complementing the patterns to produce in the example case up to 16 distinguishable sub-patterns, which are then linked together. The requirements that are imposed on the base sub-pattern to enable it to generate the larger patterns of FIG. 8 are as follows:

(i) The sub-pattern must define a measure of displacement along the mask sub-patterns, with width increments, typically equal, such that one and only one pattern has an edge transition at each of these displacement increments.

(ii) The sub-pattern is required to be cyclic, to facilitate linking with other created sub-patterns. This imposes the further requirement that each pattern have an even number of edge transitions (either direction) over the length of the pattern.

(iii) The edge transitions should be uniformly or approximately uniformly distributed among the four primary mask pattern segments. This implies that each pattern have the same or nearly the same number of edge transitions.

(iv) Because of finite resolution capabilities of most known video cameras and the characteristics of the system optics throughout no two edge transitions within a given projected pattern should be closer than a selected minimum number of unit locations. Based upon analysis of one possible camera and optical design, this minimum separation should be three units. Other applications may impose a different number. Since, within a given pattern, edge transitions must alternate between positive and negative directions (dark and light areas), this implies that the minimum width of either a 'black' or 'white' (opaque or transparent) bar or area must be three units.

(v) With four patterns, as chosen here (more or less could be used if the dictates of a particular system should so require), up to 64 unique profile lines can be defined (located and identified) by knowing only (a) which of the four projected patterns corresponds to the observed image, (b) the direction of the edge (dark to light or light to dark), and (c) the intensity state (light or dark) of the remaining three patterns at that positions in the image.

Using only these identifiers, it is possible to produce $4 \times 2 \times 2^3 = 64$ unique codes, that is, the pattern number produces a factor of four, the edge direction a factor of two, and the remaining-pattern intensity states another three factors of two, in all 64 unique possibilities that can be resolved by observing the four patterns at a given position and evaluating 64 unique possibilities that can be resolved by observing only these identifiers. Similarly, by examining the four images corresponding to these four projected patterns, up to 64 edges, or profiles, can be uniquely identified. If it is desired to define more than 64 uniquely identifiable edge transitions, without increasing the number of patterns beyond four (determined from other design considerations), this can be done by using the sequence of pattern numbers as another identifier, for example by observing which of the remaining three images has the preceding profile to the left. The code can be further extended by observing which of the then remaining 2 patterns has the next profile to the right. This can be extended to additional neighboring profiles, but utilizing only the left and right neighbors as illustrated would increase the number of identifiable edges by up to a maximum factor of 6, or 384 total edges, although the actual maximum number is less because of the other imposed restrictions. In most cases, it should be possible to identify as many profiles as there are unit locations. For resolution requirements in accordance with the example system, there are 158 uniquely identifiable profiles.

As a consequence of the imposed requirements, the sequence of digits declaring the pattern numbers (1-4) of the sequence of pattern lines, one such line perat each increment of displacement, must not duplicate any substring of three digits within the length of a cyclic subpattern. If it did, then the identifying parameters described above may repeat for that three-digit sequence in another of the up to 16 complementary sub-patterns, destroying the uniqueness requirement.

Since no two profile lines are permitted at the same unit displacement location, if two or more edges are detected in a viewed image at the same position (e.g. within an allowable tolerance of, say ± one-half pixel, or other value that may be chosen), then this is an error condition and that edge is tagged as not uniquely identified. This can occur in practice, for example, at a stepoff on the scanned object, creating a "fold" in the sequence. Additional logic may be employed to 'rescue' some or all of such non-unique profile declarations, by testing the several possible identifications to see whether one of them places the profile in sequence with previously identified profiles, rejecting identifications that place it out of sequence.

As stated, no three-digit substring may repeat itself within any sub-pattern as shown in FIG. 9. Further, within a three-digit substring, no digit can repeat, because of the aforestated requirements that profiles cannot repeat within a pattern within a three-unit separation. Thus, in a three-digit sequence, the first digit may be selected freely from among the four patterns, the second from the remaining three, and the third from the remaining two. Since there are, therefore, $4 \times 3 \times 2 = 24$ unique three-digit substrings, 24 is the upper-bound on the length of a sub-pattern under the conditions chosen for this example. This length (as well as lengths 8 and 16) satisfies the preceding requirements that permit generation of cyclic codes, i.e., equal even-numbered edge transitions and uniform edge distribution among the four patterns. In FIG. 9, the four-digit binary number shown below each substring indicates which row or rows of the code is complemented so as to produce a substring code unique from all the rest. The subpattern 14–29, labeled 0000, is the reference, i.e. uncomplemented. Roms of the subpatterns are complemented where 1's are shown, the subpatterns then cycled and truncated if necessary to link together with other differently-complemented subpatterns while retaining conformance with aforestated criteria throughout, i.e. both within each subpattern and across the links between them.

The code of FIG. 9 is displayed in FIG. 10 sorted by the pattern number (1–4) and pattern code, which comprise the aforesaid 6-bit codes capable of uniquely identifying up to 64 profiles. Each member of the 6-bit code has associated with it in this example from one through four possible profile numbers, or distance units, as listed in FIG. 10. These up-to-four possible identifications are then resolved by the aforesaid means of examining the neighboring profiles and/or assigning them in sequence.

FIG. 10A is again the pattern of FIG. 9, wherein the profile numbers are sorted by the aforementioned three-digit pattern number sequences. In this example, there are as many as eleven possible profile identifications for given three-digit sequences, resolved by using the aforesaid remaining identifiers.

To reduce the number of possible profiles for a given 6-bit code, to make it easier to resolve the correct profile using the remaining identifiers, it is possible as illustrated in FIG. 10 and mentioned above, to require no more than four repeats throughout the overall concatenated pattern of any of the basic 64 (see requirement v) codes. This restriction reduces the upper bound of the total number of unique pattern boundary lines from 384 to four times 64 or 256, and may also reduce the actual maximum number in the face of the imposed properties. However, by selecting a sub-pattern length of 16, rather than the maximum of 24 as previously discussed, and applying the stated requirements, it will be possible to assure no more than four repeats since there are no more than four repeats of each of the 4 digits in a 16-long sub-pattern, all within unique three-digit codes within the sub-pattern, and upon generating the maximum of 16 complementary sub-patterns a maximum of 4 repeats per digit therefre will necessarily occur within the above-described 6-bit code. Similarly, use of a 24 long sub-pattern would permit six repeats throughout the up to 16 complementary sub-patterns, since each of the 4 digits is repeated six times within a 24 long sub-pattern.

Once the profile line positions have been measured, or mensurated in the viewed images as described in the preceding paragraphs, it is necesary to identify the profiles. As discussed, a six-bit code is made up consisting of the pattern identification, the direction of the profile edge of the positive pattern, which is immediately known as a result mensuration process (already described), and the intensity state (0 or 1) of the remaining 3 patterns at the pixel position of the said profile.

The stated requirements were used to generate a cyclic 16-bit long sub-pattern, which was complemented as discussed by exclusive ORing or XORing it with a 4 bit code value a number of times, and merged to create the 158 bit long code shown in FIG. 9.

The variable width bar pattern shown in FIG. 9 is an example of one of many possible variations which can be used to design the widths of light and dark sections of a mask pattern. This 158 long code was developed in accordance with the design criteria set forth herein using the subpattern between locations 14–29 inclusive as a base. The binary 1's indicate dark locations on a mask pattern and binary 0's indicate light locations. Alternatively, this designation could be reversed. While the illustration is in terms of generating the projected spatial patterns via a projection mask of clear and opaque areas, other methods that can produce patterns in space according to these cirteria are contemplated as well. This 16 bit code subpattern strictly adheres to each of the five criterial requirements set forth above. The base code subpattern is arbitrarily assigned the check code 0000, the purpose of which will be detailed in what follows. The sequences of 1's and 0's in the code subpattern are not in and of themselves unique. Although each mask pattern sequence of 1's and 0's meets the 5 criterial requirements, each has a different sequence.

To ensure that the criterial requirements are satisfied at the boundries between any two subpatterns it is simply necessary to rotate or cycle the base code about itself when developing each of the subpatterns. This is made more convenient by permitting the base code to be shortened in addition to being rotated. Referring to the subpattern between locations 30–45 inclusive as an example, it can be shown in FIG. 9 that this code subpattern starts its sequence with the second half or last eight bits of the base subpattern code and then continues with the first eight bits or first half of the base subpattern. The uniqueness of all subsequent subpatterns can be checked by determining a check code which when exclusively OR'd with the base code subpattern, at like locations in the base code subpattern and subpattern to be checked, results in the second 16 bit locations 30–45 inclusive. Restating by example, it can be shown that in the base code, a pattern sequence can arbitrarily be designated to start at location 17. This pattern reads 1234214321324 and wraps back around and continues with 134. This same sequence can be defined as starting at location 39 and going to location 45 and then continuing at location 30 and ending at location 38 in the subpattern 30–45 inclusive. This subpattern string was rotated or cycled to maintain the subpattern criterial requirements at the intersection of the two subpatterns. To check the uniqueness of this subpattern with respect to all previously determined subpatterns, identical positions in the base subpattern and the subpattern to be checked are located, e.g. location 17 corresponds to location 39. A four bit check code is then determined. This check code, when XOR'd with the individual four bit code, read vertically, which corresponds to patterns 1–4 at the identified starting location, should result in the second coded-subpattern. By way of example, the second check code is determined by finding a four bit code to exclusively OR (XOR) with the four bit code 0011 found at location 17 which when XOR'd results in the four bit code 1010 at location 39. This code was determined to be 1001. To continue verification of the uniqueness of the second subpattern and to check the accuracy of the check code, this same check code when XOR'd with the four bit code 0111 found at location 18 should result in the four bit code 1110 found at lccation 40. It does. This one-to-one comparison is made with each pattern code at locations 14–29 inclusive with its corresponding location between 30–45 inclusive.

As shown in FIG. 9 some subpatterns have less than 16 locations. For example, the first subpattern locations 1–13, has only 13 locations. It can be shown that substring 132 (at positions 26–28) within the base subpattern has been removed in order to maintain the first subpattern's compliance with the criterial requirements. The uniqueness of the subpattern is also proven by determination of a four bit check code in the same manner in which check code 1001 was determined. For this subpattern the code 1111 is determined. This sequence of steps is repeated until a 158 bit long code comprised in this example of 11 of the 16 possible subpatterns is created and checked. Each subpattern has its own unique check code.

As detailed earlier herein the 158 length pattern is for designing the variable widths of the dark and light sections on the individual disc patterns. This code also can be read to determine which of the four patterns has a pattern line at any given location 1–158. Referring again to FIG. 9, the top horizontal row of number 1–158 indicates location points spanning the width of each of the four primary coded patterns in segments 28A–28D. The first vertical column of numbers 1–4, indicates which disc pattern is being examined. The second horizontal row of numbers, which vary in a determined sequence between numbers 1–4, indicates which of the four coded mask patterns had a boundary line at that given location. For example, at location 2 along the top horizontal row, the upper bit number in that vertical column is a 1, indicating that when moving from the previous location, location 1, a state change occurs in mask pattern 1. This can be more particularly pointed out by examining FIG. 9 where it is shown that pattern 1, between locations 1 and 2, changed state from dark (1) to light (0) while that of the other three patterns remained dark as shown by 1's at both locations.

To identify a profile in a system using the four mask patterns corresponding to the design code of FIG. 9, first and second solution charts of FIGS. 10 and 10A are utilized. In the first solution chart, the 16 "1" numbers in the first column correspond exactly to all the first pattern state changes in the design code. Each of these numbers 1 is followed by a the four bit code which indicates the direction of the state change for the pattern containing the boundary line, here the first, and of the remaining three patterns which patterns are dark or light at that same location in the design code. Following the four bit code are the location numbers in the design code at which changes in the first mask pattern occur. These location numbers correspond to the location of a boundary line, here those in coded mask pattern number 1. As is shown in FIG. 10 each code can identify up to four different profile line locations. To determine uniquely which one of the four possible profile lines was observed in an image, the following sequence of steps is performed assuming the code 30001 has been identified. First, the computer or other processing device scans or reads the 30001 line and determines that this code can identify profile lines occurring in pattern 3 at locations 52, 60, 68, 114 in the design code of FIG. 10. It is thus learned that the profile line is located in projected pattern 3 as established by the code and can be one of these four different profile lines. To locate and identify the exact profile line, it is noted which pattern number has the neighboring profile to the left, and which to the right. These three pattern numbers, i.e. the one to the left, the one containing the given profile, and the one to the right, form a three-digit sequence that, together with the aforementioned six-bit code, is unique within the 158 long pattern and thus uniquely identifies the given profile number. To continue the example, the profile to the left of profile 52 is number 51, which with reference to FIG. 9 occurs in pattern mask number 1. Similarly, the profile to the right, number 53, occurs in mask 2. Thus the three-digit sequence is 132, which, with reference to FIG. 10A, occurs at profiles 27, 33, 52, 71, 77, 96, 110, 129, and 154. Comparing this list with that given above based on the aforementioned six-bit code, i.e. profiles 52, 60, 68 and 114, only profile 52 appears in both lists.

Thus the profile at location 52 is the one which was observed, and so the projected light surface that produced this profile is found. This procedure is repeated until all profile lines visible in the image have been uniquely identified. As discussed earlier herein the pixel locations are also gathered and stored for each identifying code. The codes in the solution table are referred to as six bit codes because in the actual implementation of the scanner a two bit code is used to identify which coded mask pattern is being scanned. For example, pattern one is identified by 00 and patterns 2-4 by codes 01, 10 and 11, respectively.

It is desired that the imaging by photographic or video means take place only during the time the projector lights are being strobed and therefore are projecting patterns onto the object. By synchronizing the projection and imaging to occur simultaneously, assurance is obtained that the selected predetermined patterns are imaged.

When determining the six bit codes for the embodiment wherein four mask patterns are used, four separate images, and thus four separate rasters will be developed, each having up to approximately 40 profile lines thereon. In each of the the viewed image rasters, the matrix pixel locations of viewed profile lines must be associated with the profile identification locations in FIGS. 1 and 2, for example. For any given size of the matrix, is chosen arbitrarily, a particular mathematical relation exist that can be utilized to achieve this correspondence.

Upon initiation of such an overall system, the strobing controls for the projectors and cameras are triggered by means such as the Timing and Control portion 52 of the VAU 54 in a predetermined sequence. In this example each projector has two separate light sources to project patterns in two different ways. Each of the six or so projectors has each of its light sources strobed four times in one embodiment, once for each of four segment patterns 28A–28D on the disc 18, for a total of 48 flashes. In another embodiment, the two light sources in each of the six projectors are each strobed eight times, once for each of the eight segment patterns 28A–28H, for a total of 96 flashes. The first embodiment is used with the aforesaid means of processing that compares image pixels against a threshold number so as to assign them to either the dark or light portion of the pattern, and the second embodiment is used with the aforesaid means in which the corresponding embodiment is used with the aforesaid means in which the corresponding pixel values of two images of complementary patterns are compared so as to make that same determination. The video signals from the six cameras are in this example digitized at eight bits (or one byte)

per "pixel", and stored in Random Access Memories (RAMs) in the VAU. Other representative digitizations might be more or less than eight bits but typically in the range of 4 to 10 bits. In this case, two strobes are flashed at once, on opposite sides of the subject, such that any one point on the subject is illuminated by only one of the two flashes, although they could also be flashed at separate times as well. For each double strobe flash three camera views are digitized, a total of 72 images in the first implementation, or 144 in the second, each image raster here having approximately 256×256 or 65,536 pixels, although other raster sizes may better suit other applications. Once the image data is in the VAU memory, the host computer reads it from the VAU memory, in this example through an eight-bit parallel port, and stores it on a hard disc, from which it is accessed by a central processor for further processing. Alternatively, the data may be stored in other ways, or it may be processed directly without requiring storage.

As stated herein six projectors and six cameras are employed in the described application. For purposes of illustration, three of the projectors may be arranged in a horizontal equilateral triangle above the subject, which may be a person's head, and the remaining three on an equilateral triangle below the object, such that each of the upper projectors labeled for example U12A, U12B and U12C, has diametrically-opposed to it one of the lower projectors labeled for example L12D, L12E and L12F. Projectors U12A and L12D are then in opposite directions from the subject and so may be flashed simultaneously if desired without interference.

There are eight possible camera positions consistent with the symmetry of the geometrical configuration described, four upper positions labeled U14A through U14D, and four lower positions labeled L14E through L14H. Positions U14D (directly above the subject) and L14H (directly below) are not usually used for portrait sculpture applications, although the additional upper camera may be used if desired. All camera positions including L14D and L14H and all projector positions, may also be used in different configurations for other scanning applications. When a given projector is strobed, particular camera positions are more favorably located to see the illumination on the object than others; thus, not all cameras need be digitized for every strobe of a light source or every frame of the camera.

The raster scans of all cameras are normally synchronized together so that at any given point in time all active cameras are scanning the same pixel number or are at the same point in retrace. While not essential, this synchornization facilitates timing and control and data acquisition. Projector lights are flashed during the common vertical retrace interval, so that new images are produced on the camera's photosensor arrays at the same time. These images are then raster-scanned by the cameras and digitized.

From what has been said hereinbefore, it will be appreciated that numerous variations, uses, and applications of the present invention exist or may hereinafter become known, some few of which variations, uses, and applications that can be foreseen and anticipated have been briefly discussed hereinabove and are mentioned herein by way of example only and not of limitation. All such variations, uses, and applications, whether or not discussed hereinabove, are considered to be within the scope of the present invention, which is limited only by the claims which follow.

What is claimed is:

1. A system for creating data to represent a three-dimensional surface shape comprising means projecting on the surface shape distinctive patterns made up of adjacent pattern portions represented by distinctively differently positioned linear features formed by and between adjacent projected areas having differing optical characteristics, the linear features being positionally located according to a code such that the positions of the linear features projected by at least some of the different patterns are located at different distinct locations such that none of said linear features as projected are at the same location;

image sensor means positioned at a spaced location from the surface shape in position to observe the distinctive projected patterns including the linear features thereof projected on the surface shape, said sensor means including means for producing representations of selected ones of the distinctive linear features formed by the projected pattern portions, and means for processing at least two image representations of projected patterns projected on the surface shape and sensed by the sensor means, said processing means containing processing data representative of the relative positions in space of the projection means and the image sensor means, said processing means further including means for extracting information from the different image representations to establish data representative of the location in space of different points on the surface shape.

2. The system of claim 1 wherein the detectable linear features are relatively uniformly distributed among the patterns.

3. A system for representing the three-dimensional surface shape of an object, the system including radiant energy projection means for projecting energy containing distinctive patterns of adjacent areas for projection onto the object whose surface shape is to be represented, the patterns defining on the object a plurality of distinctively located profile lines defined by the linear boundary between each pair of adjacent distinctive areas in the projected patterns, the boundaries in each pattern being positioned according to a code such that the locations of the boundaries in at least some of the different patterns are at different distinct locations such that none of the linear boundaries of said projected different patterns will fall on the object at the same location, image sensor means positioned to observe the patterns projected onto the surface of the object, said sensor means including means for producing representations of selected ones of the projected patterns including the profile lines, and means for processing the data observed and produced as representations by the sensor means in at least two distinct patterns, said processing means containing processing data representative of the relative positions in space of the projection means and the image sensor means, said processing means further including means for correlating data from the different image representations taking into account the relative positions of the projector and sensor means for producing therefrom data representations of different locations in space that correspond to the locations of profile lines where they occur on the object.

4. The system of claim 3 wherein the linear boundary lines are relatively uniformly distributed among the patterns.

5. A system for use in representing the three-dimensional surface shape of an object, the system including radiant energy projection means, means responsive to energy projected by the projection means and control means for the projection and responsive means, the projection means including a source of energy capable of being controlled to produce projected energy flashes, means to focus radiant energy from the projection means onto an object whose surface shape is to be represented, and an energy transmissivity encoding member mounted in alignment with the energy source and the focusing means, said encoding member having a pattern formed thereon by a plurality of adjacent relatively energy conducting and non energy-conducting areas arranged to extend over a portion of the surface thereof in the region aligned with the energy source and the focusing means, the pattern being segmented into a plurality of discrete segments each having distinctively positioned locations and widths corresponding to the energy conducting and non energy-conducting areas thereof so that regardless of which segment is positioned in alignment with the energy source and its associated focusing means at the time a flash from the energy source is projected, the projected energy will produce a distinctive intensity pattern on the surface of the object defining on the object a plurality of distinctly located profile lines at locations defined by each pair of adjacent energy conducting and non-energy conducting areas on the encoding member.

6. The system of claim 5 wherein the source of energy is a light source and the energy conducting and non energy-conducting areas on the encoding member are substantially light conducting and substantially non light-conducting areas on the encoding member.

7. The system of claim 5 wherein the locations and widths of the light conducting and non light-conducting areas on the encoding member are determined by a code having distinct code portions that determine the locations and widths of each of the light conducting and non light-conducting areas in each segment of the pattern.

8. The system of claim 5 wherein the code is a concatenated binary code having a distinctive sub-portion associated with each pattern segment, each sub-portion having a plurality of positions representing respectively each of the light conducting and non light-conducting areas of each of the corresponding pattern segments.

9. The system of claim 5 including a light tight enclosure having positions therein for mounting an object to be represented, said light enclosure also having spaced positions therein for mounting a plurality of projection means and a plurality of light responsive means.

10. The system of claim 5 wherein the projection means has a housing with means therein for rotatably supporting the encoding member the encoding member being optically encoded, spaced first and second sources of light in the housing at locations on one side of the optically encoding member, and a separate lens assembly associated with the first and second light sources in position to focus light from the respective light sources onto the object.

11. The system of claim 5 wherein the means responsive include video camera means and means associated therewith to produce a raster onto which the images formed from the patterns projected onto the object by the projection means as viewed thereby can be registered.

12. The system of claim 5 wherein the positions and the widths of the light conducting and non light-conducting areas on the encoding member are established according to a multi-position code having one position for each light conducting and one position for each non light-conducting area in each segment.

13. The system of claim 12 wherein each code position is represented by a six-bit binary word.

14. The system of claim 13 including a solution code associated with the multi-position code, said solution code having a plurality of positions each of which corresponds to one or more positions in the multi-position code.

15. Means for producing a measured representation of a boundary formed by and between adjacent lighted and non-lighted areas projected onto an object comprising a projector having a light source and a lens system positioned for projecting light from said source onto an object, a film member positioned in alignment with the light source and the lens system, said film member having at least two adjacent distinct areas each formed of differently optically encoded patterns including patterns formed by adjacent relatively transparent and opaque areas through which light from the light source passes as it is projected by the lens system onto the object, means to move the film member in relation to the light source whereby at least two distinct areas of encoded patterns are projected onto the object at different times, camera means spaced from the projector and oriented to view the object and at least a portion of the encoded patterns projected thereon by the projector, said camera means having a lens system focused on the object and on an image plane in the camera means onto which the viewed pattern on the object is focused, means for electronically producing a separate grid pattern onto which the different focused patterns of the object as seen by the camera means are applied when each of the distinct differently optically encoded patterns is projected thereon to produce image representations thereof on the respective separate grid patterns, means for storing the separate representations produced when the at least two differently optically encoded patterns on the film member are projected onto the object, means including first image scanning means for producing at least one pair of image coordinate measurements representative of selected locations on one of the grid patterns, said measurement pair for each location identifying the coordinates of the location on the grid pattern where a linear feature occurs as formed by and between adjacent transparent and opaque encoded areas on the film member as projected onto the object occurs, another measurement indicating whether the light transition occuring thereat as sensed by the scanning means is from a light to dark or from a dark to light transition in the projected pattern, and means including other image scanning means for producing another bit of information from the grid pattern onto which the different optically encoded patterns are projected, said other scanning means responding to the location information produced by the first scanning means to produce information for each location for which measurement pairs are produced indicating at the corresponding locations on the grid pattern whether that location on the grid pattern on which the different optically encoded images are projected is in a light or dark portion of the pattern.

16. The means of claim 15 including means for storing information representative of the location on the respective grid patterns where at least two linear features occur, and computer means programmed to produce a three dimensional representation of at least a portion of the object along which one of said linear features occurs, said one linear feature being produced by the projector projecting one of said optically encoded images onto the object and by the camera means viewing at least a portion of one of the linear features from its different orientation relative to the projector.

17. Means for projecting optically encoded patterns onto a remote location comprising a projector having a spaced light source and lens system and optically encoded pattern forming means positioned in optical alignment therewith, said pattern forming means including a disc having annular patterns of light encoded areas positioned thereon, means for rotating the disc so that the annular encoded areas move relative to the light source and the lens system, the annular area including a plurality of adjacent circumferentially positioned segments each formed by a plurality of adjacent light conducting and non light-conducting areas capable of projecting patterns which are characterized by having distinct boundary lines formed by and between each adjacent light conducting and non light-conducting area, the locations of the boundary lines projected by the areas in each segment being located at distinctively different positions.

18. The means of claim 17 wherein the coded light conducting and non light-conducting areas are circumferentially extended elongated areas.

19. The means of claim 18 wherein the locations of the light conducting and non light-conducting areas in the different segments are determined according to a code characterized by a base subpattern of coded information including a distinct first set of bit information for each segment, said bit information for each set corresponding to a unit width measure of displacement along the width of said segment, said sets including bits of information representative of the width of the light conducting and the non light-conducting areas and hence the locations where the projected linear features occur, the formula for the code being such that no two linear features occur at the same location.

20. The means of claim 19 wherein information in each set is such that all projected linear features are separated by a predetermined minimum distance.

21. The means of claim 20 wherein said minimum separation distance is 3 unit widths of displacement.

22. The means of claim 17 wherein the locations of light-conducting areas and non light-conducting areas on the encoded disc are determined by trial and error.

23. The means of claim 19 including a second subpattern of coded information for extending the base subpattern of coded information to create a longer pattern of coded information, said second subpattern being derived from said base subpattern.

24. The meass of claim 23 wherein said second subpattern is derived from said base subpattern by cycling and shortening said base subpattern such that the longer pattern maintains compliance with the formula code used to create the base subpattern.

25. The means of claim 24 including additional subpatterns for further extending the longer pattern, said additional subpatterns being derived from the existing base and second subpattern.

26. A system for creating data to represent a non-patterned image of a three-dimensional surface comprising means for projecting onto the surface a sequence of patterns formed by passing light through patterned masks chosen such that selected locations on the surface are illuminated by at least one of the projected patterns in the sequence, sensor means positioned at a spaced location from the surface in position to observe distinctive projected pattern views on the surface and to produce image representations thereof, and means for processing image representations of at least two projected pattern views as observed by the sensor means, said processing means including means establishing a maximum intensity of the images at predetermined locations of the images being viewed containing processing data representative of the relative positions in space of the surface to be represented, the projection means and the sensor means, said processing means establishing at predetermined locations of a selected one of the image representations a maximum intensity of selected images thereat.

* * * * *

UNITED STATES PATENT AND TRADEMARK OFFICE
CERTIFICATE OF CORRECTION

PATENT NO. : 4,846,577

DATED : July 11, 1989

INVENTOR(S) : John R. Grindon

It is certified that error appears in the above-identified patent and that said Letters Patent is hereby corrected as shown below:

Column 4, line 4, "correspondng" should be -- Corresponding--.

Column 5, line 20, "pattern-1lluminated should be --pattern-illuminated--.

Column 5, line 25, "cross-section1" should be --cross-sectional--.

Column 12, line 3, "raster" should be --raster,--.

Column 18, line 66, "typ" should be --type--.

Column 22, line 46, "respond" should be --correspond--.

Column 25, line 51, "therefre" should be --therefore--.

Column 26, line 68, "lccation" should be --location--.

Column 34, line 19, "meass" should be --means--.

Signed and Sealed this

Nineteenth Day of June, 1990

Attest:

HARRY F. MANBECK, JR.

*Attesting Officer*  *Commissioner of Patents and Trademarks*